United States Patent
Ivarsson et al.

(10) Patent No.: US 12,418,934 B2
(45) Date of Patent: Sep. 16, 2025

(54) DISTRIBUTED UNIT SCHEDULING FOR RADIO UNIT-BASED CUSTOM TRAFFIC INSERTION

(71) Applicant: Dell Products L.P., Round Rock, TX (US)

(72) Inventors: Tommy Ivarsson, Ottawa (CA); Sewvanda Don, Ottawa (CA); John Bradley Deforge, Chelsea (CA)

(73) Assignee: Dell Products L.P., Round Rock, TX (US)

( * ) Notice: Subject to any disclaimer, the term of this patent is extended or adjusted under 35 U.S.C. 154(b) by 486 days.

(21) Appl. No.: 17/659,741

(22) Filed: Apr. 19, 2022

(65) Prior Publication Data
US 2023/0337272 A1    Oct. 19, 2023

(51) Int. Cl.
*H04W 72/566* (2023.01)
*H04W 24/02* (2009.01)
*H04W 24/08* (2009.01)

(52) U.S. Cl.
CPC ......... *H04W 72/569* (2023.01); *H04W 24/02* (2013.01); *H04W 24/08* (2013.01)

(58) Field of Classification Search
CPC ... H04W 72/569; H04W 24/02; H04W 24/08; H04W 72/1215; H04W 28/06; H04L 43/50; H04L 5/0053; H04B 7/0617; H04B 17/19
See application file for complete search history.

(56) References Cited

U.S. PATENT DOCUMENTS

2007/0014341 A1* 1/2007 Rowse ............... H04L 43/50
375/224
2009/0034487 A1* 2/2009 Lohr ............... H04L 1/1822
370/335

(Continued)

FOREIGN PATENT DOCUMENTS

CN         114024598 A       2/2022
KR      20220084075 A  *  6/2022  ......... H04L 69/321
(Continued)

OTHER PUBLICATIONS

International Search Report and Written Opinion received for PCT Application Serial No. PCT/US2022/053288 dated Mar. 22, 2023, 14 pages.

(Continued)

*Primary Examiner* — Ayaz R Sheikh
*Assistant Examiner* — Louis Samara
(74) *Attorney, Agent, or Firm* — Amin, Turocy & Watson, LLP

(57) ABSTRACT

The described technology is generally directed towards scheduling, by a distributed unit, the injection of custom traffic (signals/data) by a radio unit into a radio unit communications path. The scheduling can be such that the custom traffic can be interleaved with to live-air and/or non-live-air traffic, for example. The radio unit can request unscheduled physical resource blocks for custom traffic to be inserted by the radio unit, and the distributed unit can communicate the timing and scheduling (identify the unscheduled physical resource blocks) to the radio unit in response to the request. The custom traffic is configured to perform some action by the radio unit, such as to perform antenna calibration, to perform test and measurement operations to obtain performance data, and the like. Performance data can be used, for example, to modify operating param- (Continued)

eters of the radio unit to improve performance of the radio unit.

20 Claims, 23 Drawing Sheets

(56) References Cited

U.S. PATENT DOCUMENTS

| | | | |
|---|---|---|---|
| 2013/0030764 A1* | 1/2013 | Chatterjee | G06F 11/3452 |
| | | | 702/182 |
| 2013/0148596 A1* | 6/2013 | Shin | H04W 72/1215 |
| | | | 370/329 |
| 2013/0195026 A1 | 8/2013 | Johnsson et al. | |
| 2017/0176507 A1* | 6/2017 | O'Keeffe | H04B 17/19 |
| 2018/0092044 A1 | 3/2018 | Williamson | |
| 2018/0146454 A1* | 5/2018 | Wang | H04W 72/02 |
| 2019/0141738 A1* | 5/2019 | Namba | H04B 7/0697 |
| 2019/0327757 A1* | 10/2019 | Oteri | H04L 5/0053 |
| 2019/0364492 A1* | 11/2019 | Azizi | H04W 4/024 |
| 2020/0052746 A1 | 2/2020 | Nammi et al. | |
| 2020/0177287 A1* | 6/2020 | Yu | H04B 7/0617 |
| 2020/0267174 A1* | 8/2020 | Soulhi | H04L 63/1425 |
| 2021/0385686 A1* | 12/2021 | Ahmed | H04W 28/06 |
| 2022/0272794 A1 | 8/2022 | Aftab et al. | |
| 2023/0268967 A1* | 8/2023 | Guo | H04B 7/0617 |
| | | | 375/262 |
| 2024/0389018 A1 | 11/2024 | Sung et al. | |

FOREIGN PATENT DOCUMENTS

| | | | | |
|---|---|---|---|---|
| KR | 102673083 B1 * | 6/2024 | | H04W 88/10 |
| WO | 2022/029470 A1 | 2/2022 | | |

OTHER PUBLICATIONS

International Search Report and Written Opinion received for PCT Application Serial No. PCT/US2022/053287 dated Mar. 29, 2023, 18 pages.
International Search Report and Written Opinion received for PCT Application Serial No. PCT/US2022/053280 dated Mar. 29, 2023, 14 pages.
International Search Report and Written Opinion received for PCT Application Serial No. PCT/US2022/053279 dated Apr. 11, 2023, 20 pages.
Kumar et al., "O-RAN Based Proactive ANR Optimization", IEEE Globecom Workshops, 2020, 4 pages.
Non-Final Office Action received for U.S. Appl. No. 17/659,748, dated Jun. 14, 2024, 43 pages.
Non-Final Office Action received for U.S. Appl. No. 17/660,333, dated Jul. 30, 2024, 46 pages.
Notification Concerning Transmittal of International Preliminary Report on Patentability mailed Oct. 31, 2024 for PCT Application No. PCT/US2022/053280, 9 pages.
European Office Action mailed Nov. 26, 2024 for European Patent Application No. 22851426.1, 3 pages.
Final Office Action mailed Nov. 14, 2024 for U.S. Appl. No. 17/659,748, 36 pages.
Notification Concerning Transmittal of International Preliminary Report on Patentability mailed Oct. 31, 2024 for PCT Application No. PCT/US2022/053279, 13 pages.
European Office Action mailed Nov. 26, 2024 for European Patent Application No. 22854230.4, 3 pages.
European Office Action mailed Nov. 29, 2024 for European Patent Application No. 22851429.5, 3 pages.
Notification Concerning Transmittal of International Preliminary Report on Patentability mailed Oct. 31, 2024 for PCT Application No. PCT/US2022/053288, 9 pages.
Office Action mailed Sep. 29, 2024 for U.S. Appl. No. 17/660,331, 35 pages.
Notification Concerning Transmittal of International Preliminary Report on Patentability mailed Oct. 31, 2024 for PCT Application No. PCT/US2022/053287, 12 pages.
European Office Action mailed Nov. 29, 2024 for European Patent Application No. 22851205.9, 3 pages.
Notice of Allowance received for U.S. Appl. No. 17/660,333 dated Jan. 3, 2025, 40 pages.
Notice of Allowance received for U.S. Appl. No. 17/660,333 dated Jan. 15, 2025, 7 pages.
Notice of Allowance received for U.S. Appl. No. 17/659,748 dated Feb. 20, 2025, 45 pages.
Final Office Action received for U.S. Appl. No. 17/660,331 dated Feb. 26, 2025, 21 pages.
Office Action mailed Jun. 30, 2025 for U.S. Appl. No. 17/660,331, 26 pages.

\* cited by examiner

DISTRIBUTED UNIT SCHEDULING FOR RADIO UNIT-BASED CUSTOM TRAFFIC INSERTION

BACKGROUND

In modern wireless communications, deployment aspects and impacts of radio development engineering and system design tradeoffs have far-reaching implications into customer capital expenditures, operating expenditures, and overall completeness of enterprise radio offerings. These engineering and systems design tradeoffs result in what may be generally characterized as overall radio size, weight, thermal dissipation, reliability, complexity, and cost.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
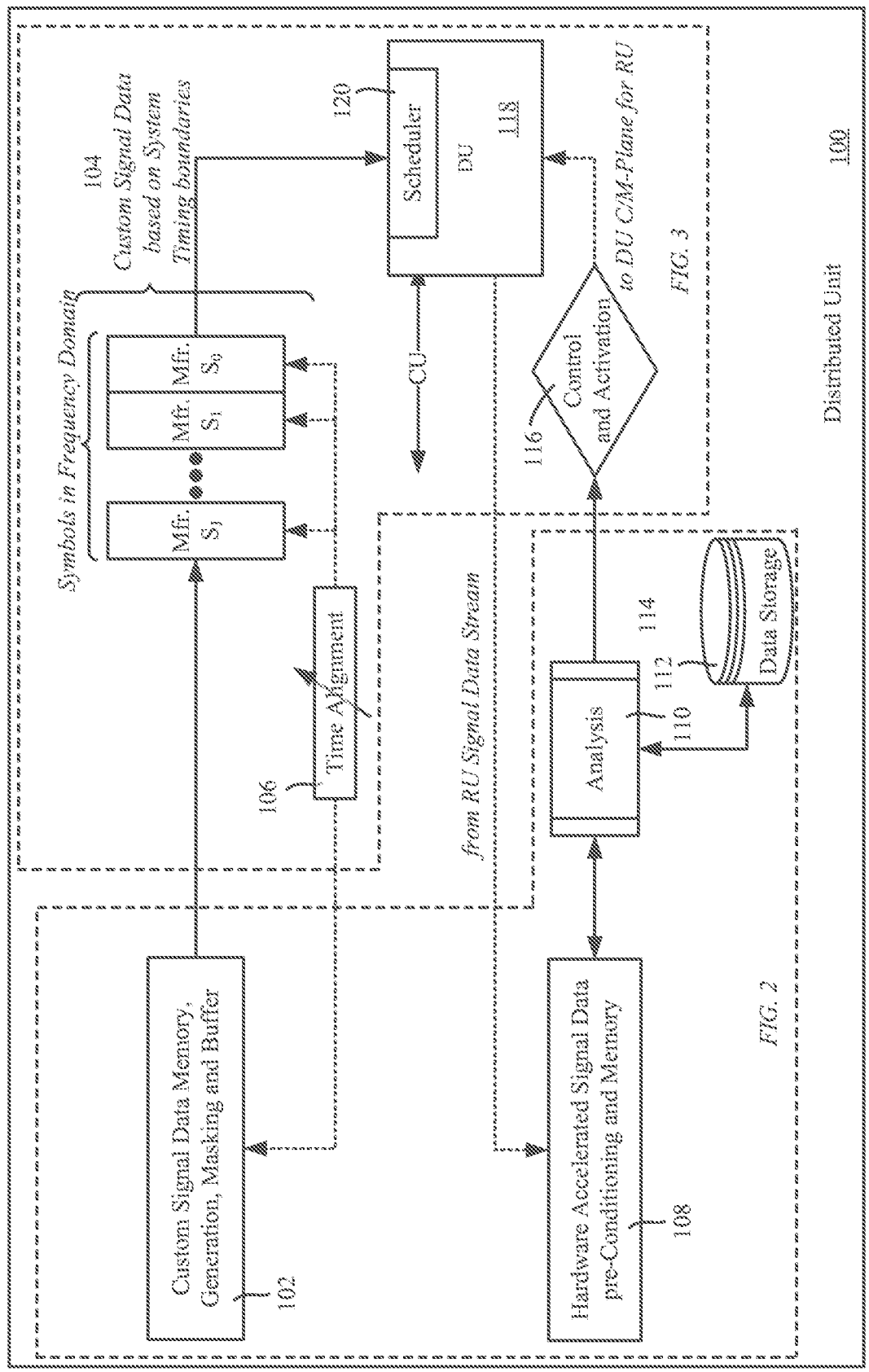
FIGS. 1-6 comprise a block diagram representation of an example system in which a distributed unit (FIGS. 1-3) is coupled to a radio unit (FIGS. 4-6) to schedule radio unit-based custom traffic insertion, in accordance with various aspects and embodiments of the subject disclosure.

Various aspects of the technology described herein are generally directed towards scheduling, by a distributed unit, the injection by a radio unit of custom traffic (signals/data) into a communications path of the radio unit. Somewhat analogous to custom waveforms obtained from a signal generator, custom signal injection as described herein can be added to (e.g., interleaved with) live-air (sometimes referred to as mission mode) traffic, some non-live-air (sometimes referred to as non-mission mode) traffic, or a hybrid of live-air signals and custom signals, some of which can be independent of live-air signals. In general and as described herein, the radio unit is responsible to furnish the injected signal data.

The technology leverages the ability for the radio unit to generate (or obtain previously generated) customized data and inject the customized data into the signal chain. For example, the distributed unit can message the radio unit so as to communicate the enablement of the radio unit to use unscheduled physical resource blocks for injecting the custom data. The injection of customized data facilitates performing of some action by the radio unit, such as (but not limited to) the deriving of performance data from radio subsystems, performing a needed action (e.g., antenna calibration) by the radio unit, running a self-test by the radio unit, and/or the like. As one non-limiting usage example, information obtained based on the injected custom data can be analyzed, and used to modify the radio unit's operating parameters, e.g., to improve radio performance, conserve or more efficiently use power and/or the like.

Modern cellular systems have continued to advance, to a point where dynamic changes can be made to improve one or more aspects and/or to provide one or more new services and/or other aspects. These dynamic changes can benefit from knowledge, information and/or data regarding how a system is functioning, system issues, troubleshooting performance and/or adjustments made to address functions and/or issues. That is, such knowledge, information and/or data relative to hardware, firmware and/or software can be useful in proactively addressing such issues, performing troubleshooting, and overall, improving one or more systems, and/or subsystems of such cellular systems, such as of related radio systems. Collecting of such knowledge, information and/or data is thus highly useful, and the more detailed the knowledge, information and/or data, the more useful it is to the collector.

Any data obtained based on the custom injected signals can allow for real-time, immediate, short term and/or long term improvements of radio subsystems. In addition to real-time or near real-time modification of a radio unit's operating parameters to improve performance of the radio unit, actions such as troubleshooting and/or predictive modeling can be performed with respect to radio system performance, failures, issues, continuity and/or other aspects. For example, the resulting "clean" and/or statistically accumulated data, such as telemetry, radio frequency (e.g., analog data) and/or digital performance and/or comparative data, and/or underlying infrastructure utilization statistics can be used to improve network performance, plan network capacity, and/or identify new service opportunities, relative to the radio system. Various types of data can be collected, such as, but not limited to, data represented in a frequency domain (FD) and data represented in a time domain (TD).

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

It also should be noted that terms used herein, such as "optimize," "optimization," "optimal" and the like only represent objectives to move towards a more optimal state, rather than necessarily obtaining ideal results. For example, "optimizing" a network/system/cell means moving towards a more optimal state, rather than necessarily achieving an optimal result. Similarly, "maximize", such as to "maximize throughput" means moving towards a maximal state, not necessarily achieving such a state.

The technology described herein facilitates distributed unit-based timing and synchronization for injection by a radio unit of custom (signal) data into data to be transmitted by the radio unit. That is, the technology described herein facilitates radio unit-based injection of custom signal data into the signal chain, according to timing and synchronization data determined by the distributed unit, e.g., corresponding to otherwise unscheduled physical resource blocks.

Such custom data can be used by the radio unit to perform some desired action/application, including, but not limited to, antenna calibration (AntCal) as needed by ORAN radios. Another desirable action/application can be to perform an autonomous self-test at the radio unit based on the injection of custom signal data arranged for such a test. Yet another exemplary action/application facilitates a radio unit energy efficiency increase, through customized scheduling derived from performance measurements that are based on custom signal data, which, for example, can result in withholding of data and/or load-leveling of data.

In general, the custom signal data is known to or otherwise obtainable by the radio unit. For example, the radio unit can inject the custom signal data, or otherwise obtain (e.g., download) the custom signal data to the radio unit to inject in available (otherwise unscheduled) resource locations. The radio unit can act autonomously with respect to injecting its own custom signal data, with the distributed unit coordinating the scheduling and timing corresponding to the locations in which the radio unit can inject the custom signal data; (the distributed unit thus need not necessarily have any knowledge of the custom signal data).

Notwithstanding, the distributed unit can request that the radio unit perform some action (e.g., run test 'X'), with the custom signal data to perform test 'X' obtainable by the radio unit, e.g., already preconfigured in the radio unit's memory or accessible from a remote source (not necessarily the distributed unit). Thus, although in one or more implementations described herein the radio unit (and not the distributed unit) prepares/injects the custom data to be transmitted via the radio unit communications (e.g., U-Plane data) path, the distributed unit may understand applications where those applications use custom signals injected at the distributed unit, that is, the distributed unit may have a priori knowledge of the custom data. Notwithstanding, the distributed unit may have no knowledge of the custom traffic; it is also feasible for both the distributed unit and the radio unit to originate and prepare custom data, e.g., at different times for different purposes.

In some example scenarios, such as test and performance measurement applications, the custom signal data can be considered clean "source" data. When injected into communications path (downlink or uplink) and transmitted, the resulting transmitted data can be received and evaluated against the clean data to determine, based on difference from the clean data, how the radio unit is currently performing.

Indeed, among other benefits, the use of custom signals facilitates measurement and analysis of radio performance of a radio unit, which can be used by the radio unit and/or the distributed unit or other entity (if sent thereto by the radio unit) as desired. For example, the distributed unit or another entity may receive performance data from the radio unit that is based on the injected custom data, and may process, analyze and/or store performance data, such as to change the operating parameters of the radio unit based on the performance data. The radio unit itself may process, analyze and/or store performance data, and change its own operating parameters accordingly.

In some examples, with regard to originating custom data and to analyzing a radio (e.g., via hardware acceleration), knowing the source signal (e.g., data) in advance can be used to determine performance based on the injected signal. That is, there can be a case where input data is not captured in the system, but is known to the system. In such a case, a derivation of performance based on the pre-selected captured data can be compared in memory to the original data (rather than captured data), where the original data is determined based on a memory comparison rather than a capture. This approach can save computing resources relative to capturing the input data.

The radio unit may originate a request for unscheduled physical resource blocks (PRBs), and message the distributed unit to initiate and act on the request. The distributed unit may respond to such a radio unit request, including to autonomously originate an un-scheduling of physical resource blocks.

Thus, in one or more implementations, the distributed unit and the radio unit interact to have the custom signal information injected for transmission by the radio unit. Timing and synchronization as determined by the distributed unit and communicated to the radio unit provide the available opportunities for the injection of the custom signal information.

The distributed unit scheduler typically has knowledge of traffic levels in advance of transmission. The distributed unit can communicate through messaging with the radio unit to indicate the presence of upcoming custom traffic, such as for opportunistic enablement on behalf of the radio unit for system performance measurement options.

Further, one enterprise's distributed unit may interwork with other enterprises' (third-party) radio units. For example, the distributed unit can opportunistically communicate radio performance improvement through messaging to any such device.

For radio unit-based injection, the distributed unit autonomously schedules locations for injecting the custom signal data (symbol data, resource block (RB) data, resource element (RE) data, modulation and coding scheme (MCS) data, load data and/or no data/blanked data symbols) to allow RB/RE insertion by the radio unit. The distributed unit can schedule such symbols/RBs/REs, MCSs, loads, blanks on the user plane (U-plane) and message the radio unit via the control plane (C-plane) for expressing the timing and synchronization data.

In one exemplary case, the distributed unit may periodically schedule custom signals coherent with live traffic signal data. Time periods scheduled by the distributed unit may be during live-air mode DL transmission, guard slots, or non-live-air mode periods.

In one or more alternative implementations, the radio unit may originate and prepare (inject) custom data to be transferred to the distributed unit via the uplink path. The radio unit may inject custom RB/REs into the locations (unscheduled) or otherwise released by the distributed unit. Some or all RB/REs may be scheduled by distributed unit to be available for radio unit derived functions. In advance of transmission, the distributed unit may schedule the release of RBs/REs to enable the radio unit, in a given scheduled time period or frequency allocation communicated as scheduled to the radio unit, for execution of further functions.

The distributed unit's scheduling of custom data may be interleaved with live-air traffic, that is, without disruption of normal radio unit traffic. This custom data can be scheduled in a 'private' slot or interleaved with signal data in the live-air traffic. Non-live-air traffic can be similarly scheduled in conjunction with custom data traffic.

In general and as described herein, coordination exists between the distributed unit and (a sufficiently configured) radio unit for time alignment and/or time stamping of data, which can include sequence-based coordination, e.g., according to a pattern understood/agreed upon by the distributed unit and radio unit, which can, for example be a periodic schedule/pattern. A distributed unit scheduler can have knowledge of signal data transmitted to the radio unit, and in one example, such a signal can be a reference signal, which can be customized for a relatively deeper evaluation of radio performance compared to simple reference signal reporting. A distributed unit also may communicate and message the radio unit, such as to control/modify operating parameters of the radio unit to improve radio unit performance based on any captured and returned performance data.

Thus, in one non-limiting example scenario, the distributed unit can specify and communicate the radio unit to perform a test case that activates a particular state of a radio unit's internal tap and loopback mechanisms. In an alternate non-limiting example scenario, the radio unit has knowledge of a reference signal and timing data, and autonomously configures the radio unit for a radio performance test during the presence of the reference signal. In an alternate non-limiting example instance, a radio unit captures data based on performance of the radio in the presence of a reference signal.

Thus, in one or more implementations, the distributed unit can communicate with the radio unit to route data back to the distributed unit. The distributed unit may advantageously make use of lesser utilized uplink path resources to import such data (e.g., performance data) from the radio unit. The distributed unit may determine a new state of radio performance and compel (or suggest that) the radio unit to activate this new state. The radio unit may reconfigure key performance parameters to optimize based on (but not limited to) messaging from the distributed unit. The distributed unit may analyze data and generate control information to be applied by the radio unit and sent to the radio unit via control plane messaging. In an exemplary case the message received by the radio unit may be used to modify the system performance of the radio unit.

Any or all antenna branches can be made optionally available by the distributed unit for use by the radio unit.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 2:
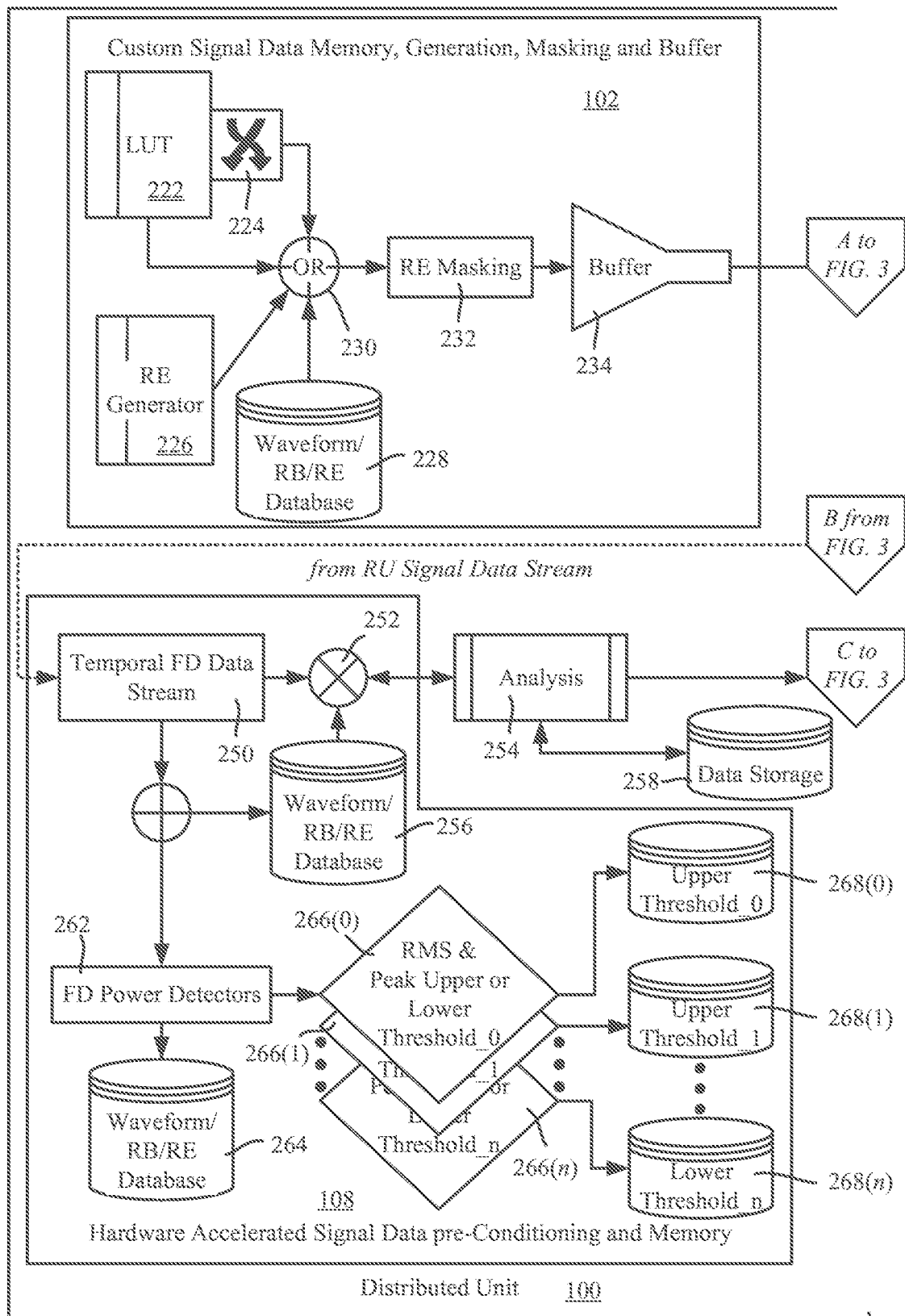
Figure 3:
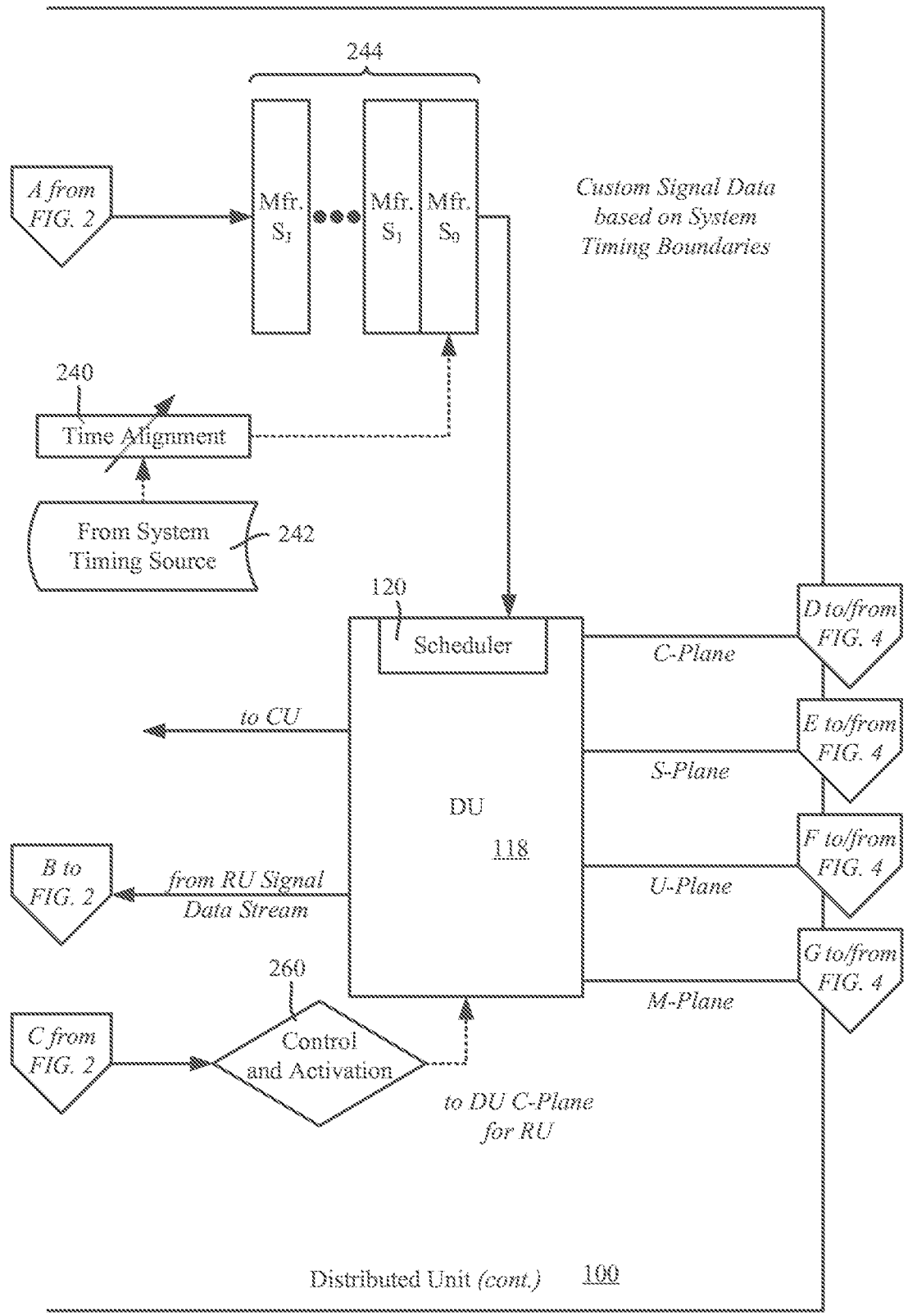
Figure 4:
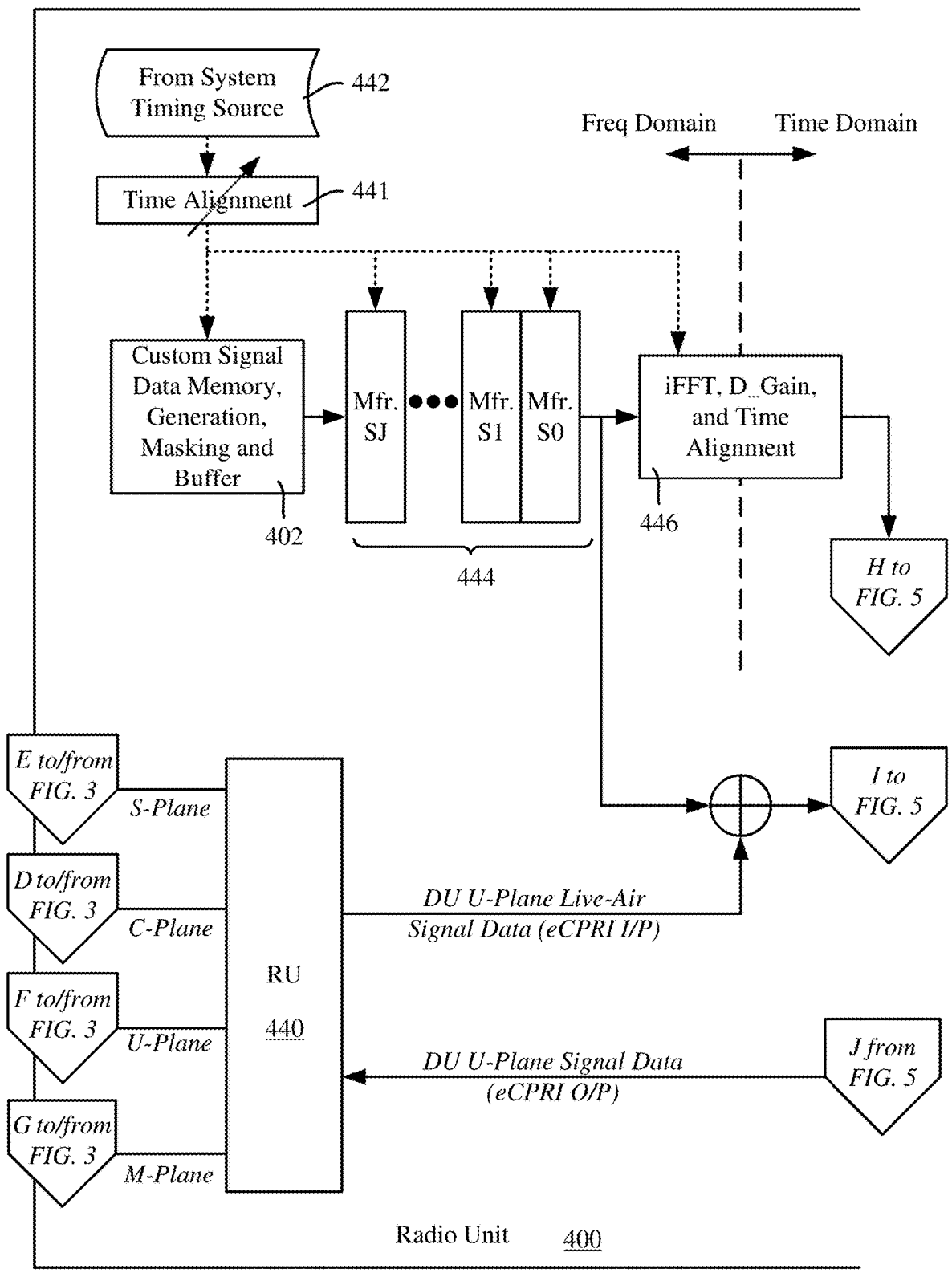
Figure 5:
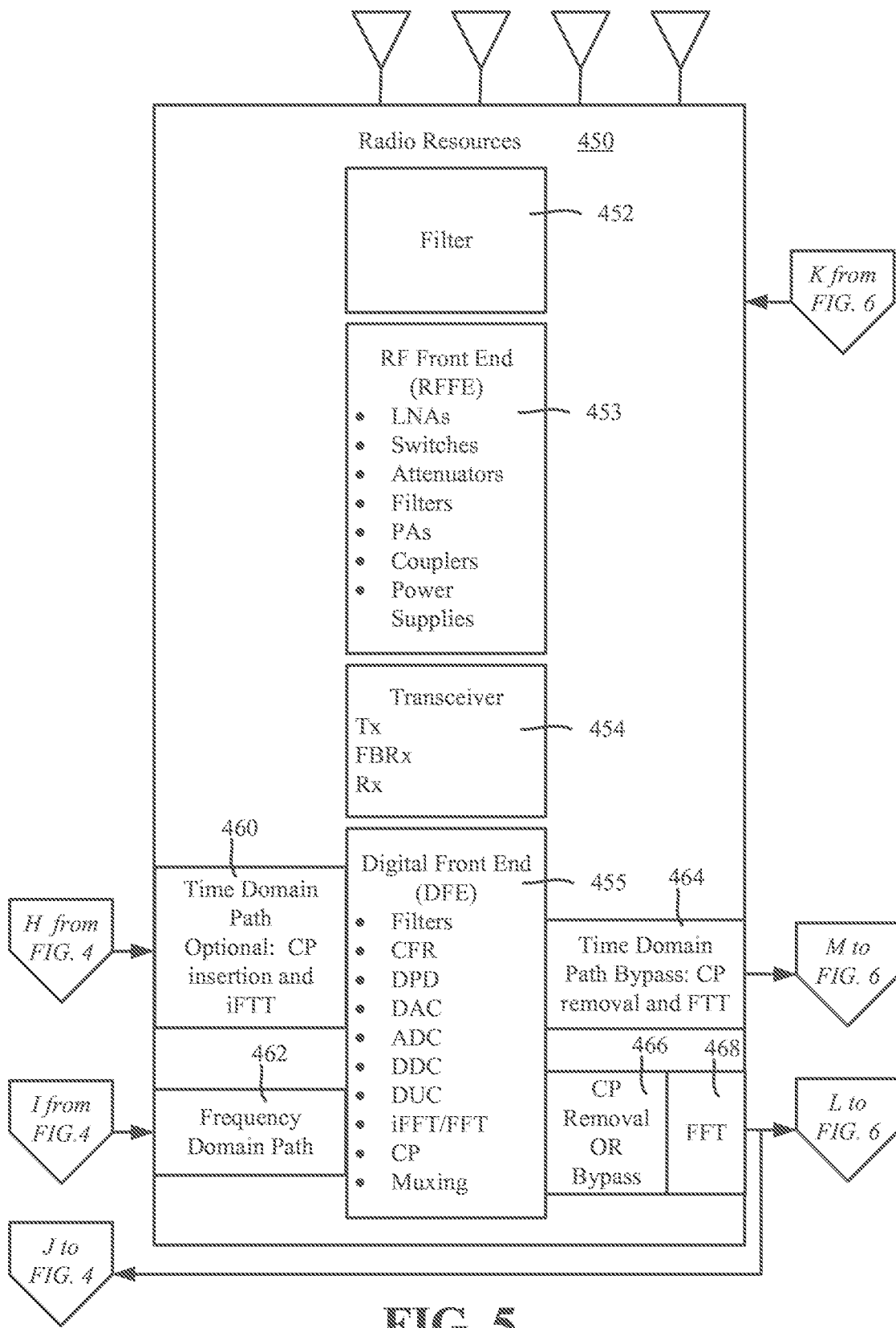
Figure 6:
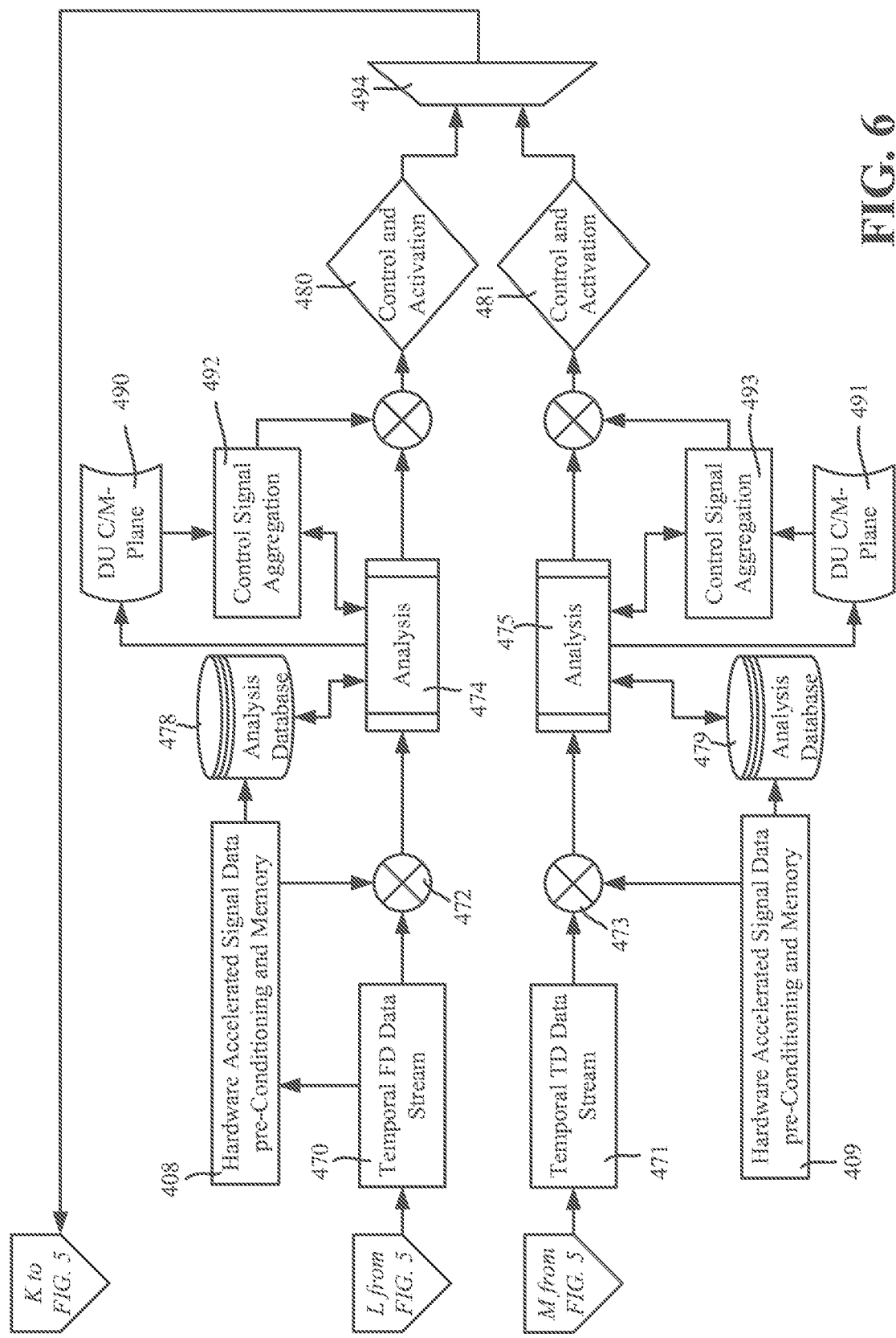

FIGS. 1-6 illustrate an example system architecture for a radio system including a distributed unit (DU) 100 (FIGS. 1-3) coupled to a radio unit (RU) 300 (FIGS. 4-6). As will be understood, the radio system can facilitate injecting custom data into a radio system's signal chain, which as described herein can be used to obtain radio performance data of the radio unit 300 (FIG. 3). As described herein, the custom data can be captured at any of various "tap" points in the signal chain (FIGS. 7 and 8); however regardless of where the custom data is captured, the performance data derived based on the custom data can be terminated at the distributed unit 100 (FIGS. 1-3) in accordance with one or more implementations described herein. Although not explicitly shown in FIGS. 1-6, the technology described herein can be applied to coverage for all antenna branches.

Custom data can be injected at any tap point along a system's signal chain in a downlink, feedback, or uplink path. Data can pass through one or multiple digital front end blocks. Data can pass to an analog portion of a radio's signal chain. Multiple injection and capture paths can exist where a multiplicity of signal data can be introduced at different tap points, which can include different antenna branches, simultaneously.

FIG. 1 shows a generalized overview of the components of the distributed unit 100, with FIGS. 2 and 3 providing additional details of the components. In FIG. 1, block 102 represents custom signal data generation memory, generation, masking and buffer components that perform O-DU and O-RU signal generation as further detailed in FIGS. 2 and 3, (where "O-" represents ORAN, or open radio access network). The custom signal data 104 can provide local synchronized (time-aligned, block 106) custom and live-air (mission mode) traffic, which can cause a stimulus with known characteristics via symbols in the frequency domain.

Block 108 of FIG. 1 represents hardware accelerated signal data pre-conditioning and memory components, which perform frequency domain signal data detection and binning, as described in more detail with reference to FIG. 2. In general, the information from a radio unit signal data stream is received at block 108, which is coupled to an analysis component 110, which in turn is coupled to a database 112. Signal capture data analysis by the analysis component 110 can include algorithms, and/or a machine learning and/or artificial intelligence (ML/AI) agent with training (both live and stored real time, and statistical data) to provide an output/response (access to actuators).

The analysis component 110 output is able to be used for control and/or activation (block 116), which inputs augmented information available to the ML/AI agent, for example to affect output of actuators. A DU portion 118 comprising a scheduler 120 facilitates the sending of such control and/or activation-related data to the radio unit 400 (FIG. 4), e.g., via control plane (C-Plane) and/or management plane (M-Plane) communications. Note that as known in new radio, the DU portion 118 is also communicatively coupled to a centralized unit (CU), not explicitly shown.

FIGS. 2 and 3 depict the example components of the distributed unit 100 in more detail. As shown in FIG. 2, the custom signal data generation memory, generation, masking and buffer components 102 comprise data/signal sources including a lookup table (LUT) 222, a pseudo-random lookup table generator 224, a resource element (RE) generator 226 and a memory, shown as a waveform resource block (RB)/RE database 108. The example components 102 further include an OR gate 230, which allows any of the data/signal sources 222, 224, 226 and/or 228 to provide the data/signals. Also shown as part of the example components 102 are an RE masking component 232, and a component 234, which can comprise a buffer, for created RB/RE data from the data/signal sources.

For example, the lookup table 222 can be configured to store predetermined inphase and quadrature (I/Q or I+Q) data values, which are each able to represent a component of a constellation of a given modulation coding scheme (MCS) level. Data of the lookup table 222 data can be played in order, or randomized to be playable in any order. In some examples, a lookup table can fulfill a given constellation/MCS symbol map and a predetermined complementary cumulative distribution function (CCDF). A signal from a lookup table can be a one-tone signal or a multi-tone signal.

The pseudo-random lookup table generator 224 can operate in conjunction with the lookup table 222. The pseudo-random lookup table generator 224 can comprise a block that operates on the lookup table's I/Q data and produces a pseudo-random symbol of data values of suitable random distribution. Values can be selected from the lookup table in a random fashion to fulfill a symbol (e.g., a complete RB matrix) of signal data.

Regarding dimensioning, one I+Q data value can be equivalent to one resource element/sub-carrier in a frequency domain. In an example, there can be up to 4,096 resource elements of I+Q, up to N bits (signed data pairs), where, for example N can equal sixteen. In an example, data generated for a radio unit can support masking so that all, or a subset, of the 0 to 4,095 resource elements available can either be passed to, or removed from, a data stream via an AND/OR block. In some examples, a mask can be enabled or disabled, where a disabled mask is a pass-through state.

MCSes can be available as supported by radio requirements. Data can be triggered and time-aligned with system timing on a symbol-by-symbol basis. In some examples, data can be triggered and time-aligned based on other relevant system time boundaries.

In some examples, data AND/OR blocks can be implemented for selecting a source of data. The distributed unit 100 can provision one resource, or a plurality of resources, of signal data available to radio unit sourced signal data for injection of custom data. Data can be sourced purely from a distributed unit live-air traffic U-plane path source (that is, the data can be live-air traffic data).

As described with reference to FIG. 4, data can be sourced purely from sources (block 402) internal to a radio unit, and injected into the user plane (U-plane) data path; (that is, the data can be non-live-air traffic data). As in FIG. 2, such radio unit sources 402 can include a memory, a dynamic RB/RE generator, a lookup table, and/or a pseudo-random lookup table, with or without a mask enabled. Data can be sourced from a combination of both sources for a distributed unit and radio unit U-plane; (that is, the data can be a hybrid of live-air traffic data and non-live-air traffic data).

In some examples, pure live-air traffic signal data, hybrid custom and live-air traffic signal data, and full custom data can be generated on the distributed unit 100 alone. In some examples, a radio unit such as the radio unit 400 can pass live-air traffic data unmodified (e.g., pure live-air traffic data), can manufacture a custom hybrid data of custom and live-air traffic data, and can provide full custom data. That is, in examples, data (be it pure, hybrid, or full-custom) can be solely originated by the radio unit, or solely originated by the distributed unit, or both at different times/for different purposes. In some examples, a combination of live-traffic data from a distributed unit and hybrid-custom data from a radio unit can be originated.

Thus, custom data (which can sometimes be referred to as a value, or a signal or a waveform when viewed over a time period) according to the technology described herein can be originated in several ways, including via the data/signal sources 222, 224, 226 and/or 228 of the distributed unit (or similar sources in the radio unit). For example, the memory/waveform database 228 can be configured to temporally play a suitable waveform or noise-like signal; a dynamic resource block (RB)/resource element (RE) allocation can be configured to, in some examples generate between 1 and 4,096 (or other) inphase and quadrature (I+Q, or I/Q) up to N-bit (signed) data pairs of arbitrary sub-carrier values for a given desired modulation coding scheme (MCS). Such a dynamic RB/RE allocation can be operated as a Moore machine or a Mealy machine.

As shown in FIG. 3 via the continued components of the distributed unit 100, a time alignment component 240, coupled to system timing source 242, aligns the custom data based on system timing boundaries for output via a buffer 244; ("Mfr." represents that manufacturer/entity that owns/builds and/or operates the distributed unit, and possibly also can be the manufacturer of the radio unit). The DU portion 118 of the distributed unit comprising a scheduler 120 is shown as in FIG. 1; the DU portion 118 returns information from the radio unit signal data stream, wherein the information is based on the custom data.

The buffer 244 can ensure time alignment of the custom signal. The buffer 244 can buffer (or trigger or gate) the custom signal until determining an appropriate system time (based on time alignment 240) to release custom signal forward in the signal chain. Time alignment 240 can use system timing of a logic device to advance or slow gating of a data stream. In some examples, this can be an ON/OFF. On other examples, this can operate as a more complex timing/gating pulse where data presence or absence can follow other system timing triggers, such as time-division duplexing (TDD) downlink/uplink and guard period timing, power amplifier on or off (PA_ON/OFF), symbol start/stop markers, blanking, and so forth. By selectively masking a portion of the signal via block 232, the buffer 244 can create a resource block or resource element from the masked signal, and time alignment 240 can time align the resulting signal to a system time boundary of the radio unit. Note that such buffering and time alignment also can apply to operations at the radio unit 400, as described with reference to FIG. 4.

Returning to FIG. 2, the information from the radio unit signal data stream is received by the hardware accelerated signal data pre-conditioning and memory components 108 at a temporal frequency domain (FD) data stream component 250, which is coupled to AND gate 252, and in turn coupled to an analysis component 254. Also providing input to the AND gate 252 is data from a waveform/RB/RE database 256. In this way, for example, both the original custom data and the source data can be analyzed together with respect to one another. Output from the analysis component 254 can be maintained in data storage 258, and, as shown in FIG. 3, can be used for control and/or activation (block 160) purposes to the DU portion 118, e.g., via the control plane and/or management" plane (C/M-Plane) for communicating to the radio unit 400 (FIG. 4; in FIG. 4, an RU communication portion 440 is shown for S-Plane (synchronization plane), C-Plane, U-Plane (user plane) and M-Plane (management plane) communications with the distributed unit 100).

Returning to FIG. 2, the temporal FD data stream 250 can also be input to FD power detectors 262, (as also described with reference to FIG. 8). The power detectors 262 can output data for maintaining in a data structure 264, e.g., for later processing, and data with respect to RMS threshold detection (from peak upper to lower thresholds, blocks 266(0)-266(n) and 268(0)-268(n)) and/or other processing.

The distributed unit 100 need not generate (or access if already generated) and/or inject the custom data into the communications downlink path. Rather, the radio unit 400 can generate/access and inject the custom data in communications path, in time slots scheduled by the distributed unit 100/scheduler 120. It is also feasible to have a system in which both the distributed unit 100 and the radio unit 400 generate and inject the custom data at coordinated times. For example, a radio unit can be configured with certain test and performance measurement operations, and/or other (e.g., antenna calibration) operations, each of which correspond to the radio unit generating (or accessing if already generated) and injecting certain custom data to perform; at coordinated times, the distributed unit 100 can generate and inject different custom data to have the radio unit perform different operations. In any event, as described herein in one implementation the radio performance data or other resulting data is terminated at distributed unit, e.g., for analysis, storage, and so forth.

Thus, because the radio unit 400 can, instead of or in addition to injection of custom data by the distributed unit 100, FIGS. 4 and 5 depict example components of the radio unit 400 comprising similar data/signal sources (block 402). More particularly, block 402 represents custom signal data, memory, generation, masking, and buffer components. As in the distributed unit custom signal generation (FIGS. 2 and 3), radio unit custom signal generation includes time alignment 441 and a timing source 442, which time-aligns the custom data based on system timing boundaries for the buffer 444; ("Mfr." represents that manufacturer/entity that built and/or operates the radio unit, and possibly also can be the manufacturer of the distributed unit). Such radio unit-injected frequency domain and/or time domain custom data can provide a stimulus with known characteristics, which can be coordinated for live-air signal data synchronization based time alignment, and for example, can result in data forwarding for analysis.

FIG. 4 also shows the time alignment component 441 coupled to an inverse Fast Fourier Transform (iFFT) 446. The iFFT 446 is coupled to the buffer 444 of custom data, and also can perform delta gain, time alignment, and optional cyclic prefix (CP) insertion on the custom data.

FIG. 5 shows other radio unit resources 450 including a filter 452, radio frequency (RF) front end (RFFE) 453 (which can include low noise amplifiers (LNAs), switches, attenuators, filters, PAs, couplers, and power supplies), transceiver 454 (which can include Tx, FBRx, and Rx), and digital front end (DFE) 455 (which can include filters, CFR (crest factor reduction), DPD (digital pre-distortion), a digital-to-analog converter (DACs), an analog-to-digital converter (ADC), a digital down converter(s) (DDC), a digital up converter(s) (DUC), an iFFT/FFT, CP, and multiplexing (muxing)). Other elements in the DFE 455 can include tap points (FIGS. 7 and 8), power detectors, signal generators, hardware accelerated preconditioning, and pre-processing of the signal data. An example power detector can include/perform hardware accelerated preconditioning, time domain triggering, gating, masking and markers, frequency domain subcarrier selection and masking, pre-processing, statistical counters/accumulators, threshold detection, binning, can start/pause/stop data collection, can perform data pruning. Such a power detector can have the ability to use hardware accelerated pre-conditioned in real time with analysis and actuator blocks with minimal or substantially reduced post processing.

Further depicted in FIG. 5 are time domain path 460 (also for optional CP_injections and iFFT), and frequency domain path 462 coupled as inputs to the DFE. At the output, time domain path 464 (which can bypass CP removal and FFT), CP removal or bypass 466, and FFT 468 are shown.

Similar to the distributed unit components of FIG. 1, including frequency domain components (even numbers starting at 470) but further depicting some time domain (TD) components (odd numbers starting at 471, which could be similarly incorporated into the distributed unit 100), FIG. 6 shows additional radio unit components, including hardware accelerated signal data pre-conditioning and memory components/functions 408 and 409. The components/functions 408 and 409 facilitate O-RU local frequency domain (FD) signal data capture and storage and O-RU local time domain (TD) signal data capture and storage, respectively.

As shown in FIG. 6, the temporal FD data stream 470 and hardware accelerated signal data pre-conditioning and memory components/functions 408 are coupled via gate 472 to an analysis component 474, which is coupled to an analysis database 478. FD signal data detection can include or be coupled to binning and storage. The temporal TD data stream 471 and hardware accelerated signal data pre-conditioning and memory components/functions 409 are coupled via gate 473 to an analysis component 475 which is coupled to an analysis database 479. Time domain signal data detection can include or be coupled to binning and storage. The hardware accelerated signal data pre-conditioning and memory components/functions 408 and 409 are respectively coupled to the analysis databases 478 and 479.

The signal capture data analysis can include algorithms, an ML and/or AI agent with training (both live and stored real time, and statistical data) that provide an output/response via access to actuators. To this end, based on data/results of the respective analyses, the analysis components 474 and 475 can communicate with the distributed unit 100 via the C-plane and/or M-plane (blocks 490 and 491, respectively) and with control signal aggregation (blocks 492 and 493, respectively, which are also coupled to the DU C-Plane control data blocks 490 and 491). The control signal aggregation blocks 492 and 493 can input augmented information, e.g., available to ML/AI agent, to affect the output of actuators. That is, data based on the results of the analyses, which can be streamed or taken from storage, and control signal aggregation can be used for control and activation purposes, via respective blocks 480 and 481. With respect to actuator aggregation, the control and activation output (blocks 480 and 481) can be collected and returned (block 494) to the radio resources 450 (FIG. 5) for use, e.g., in modifying radio operation/affect the radio and radio performance.

Figure 7:
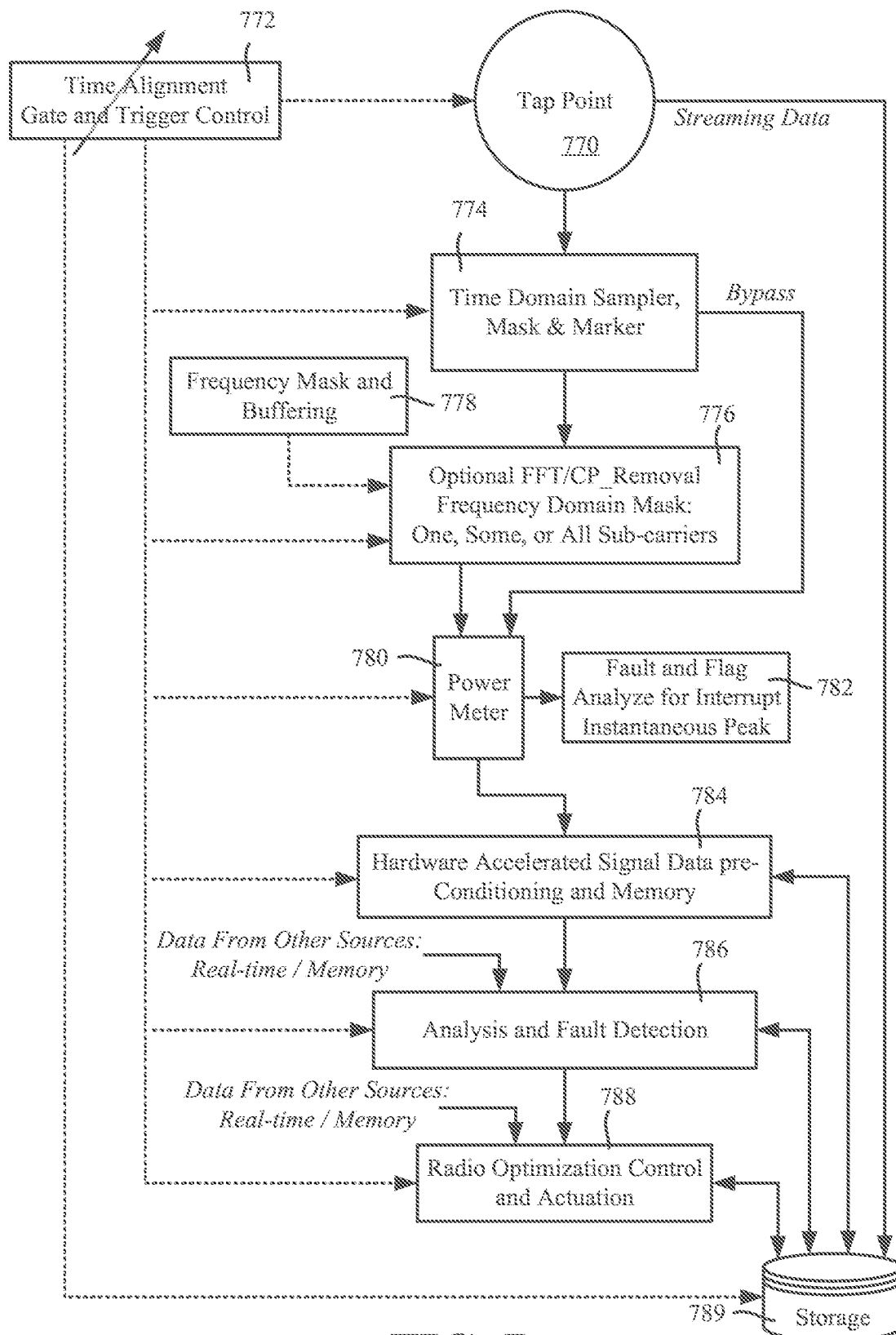
FIG. 7 is a block diagram representation of an example time domain tap point for detecting power and hardware acceleration of data preconditioning, in accordance with various aspects and embodiments of the subject disclosure.

As set forth herein, the example system architecture radio unit 400 can facilitate signal injection at radio tap points at various locations, including, but not limited to, before any digital front end block(s), before digital pre-distortion, after digital pre-distortion/before digital-to-analog conversion for signal amplification and transmission, and the like. FIG. 7 shows an example of a time domain tap point 700 coupled to time alignment gate and trigger control 772 and a time domain sampler, mask and marker function 774. Note that this is only one example, and it can be readily appreciated that alternative configurations may not be strictly as shown.

The time domain sampler, mask and marker function 774 is coupled to, but can bypass, an optional FFT/CP_Removal frequency domain mask 776 that can be used to select one, some, or all sub-carriers. Frequency mask and buffering block 778 provides input to the FFT/CP_Removal frequency domain mask 776. A power meter 780, in conjunction block 782, can facilitate a fault and flag analyze for interrupt instantaneous peak operation.

The power meter 780 is coupled to hardware accelerated signal data pre-conditioning and memory component 784, which provides input to analysis and fault detection component 786. This input, which along with any data from other sources (real-time data/memory sources), results in output that can be used for radio optimization control and actuation (block 788). Note that radio optimization control and actuation can also use data obtained from any other sources (real-time data/memory sources). Further note that storage 789 is coupled to time alignment 772 and for streaming data of the tap point 770, and is read/write accessible to the hardware accelerated signal data pre-conditioning and memory component 784, the analysis and fault detection component 786 and the radio optimization control and actuation function (block 788).

Figure 8:
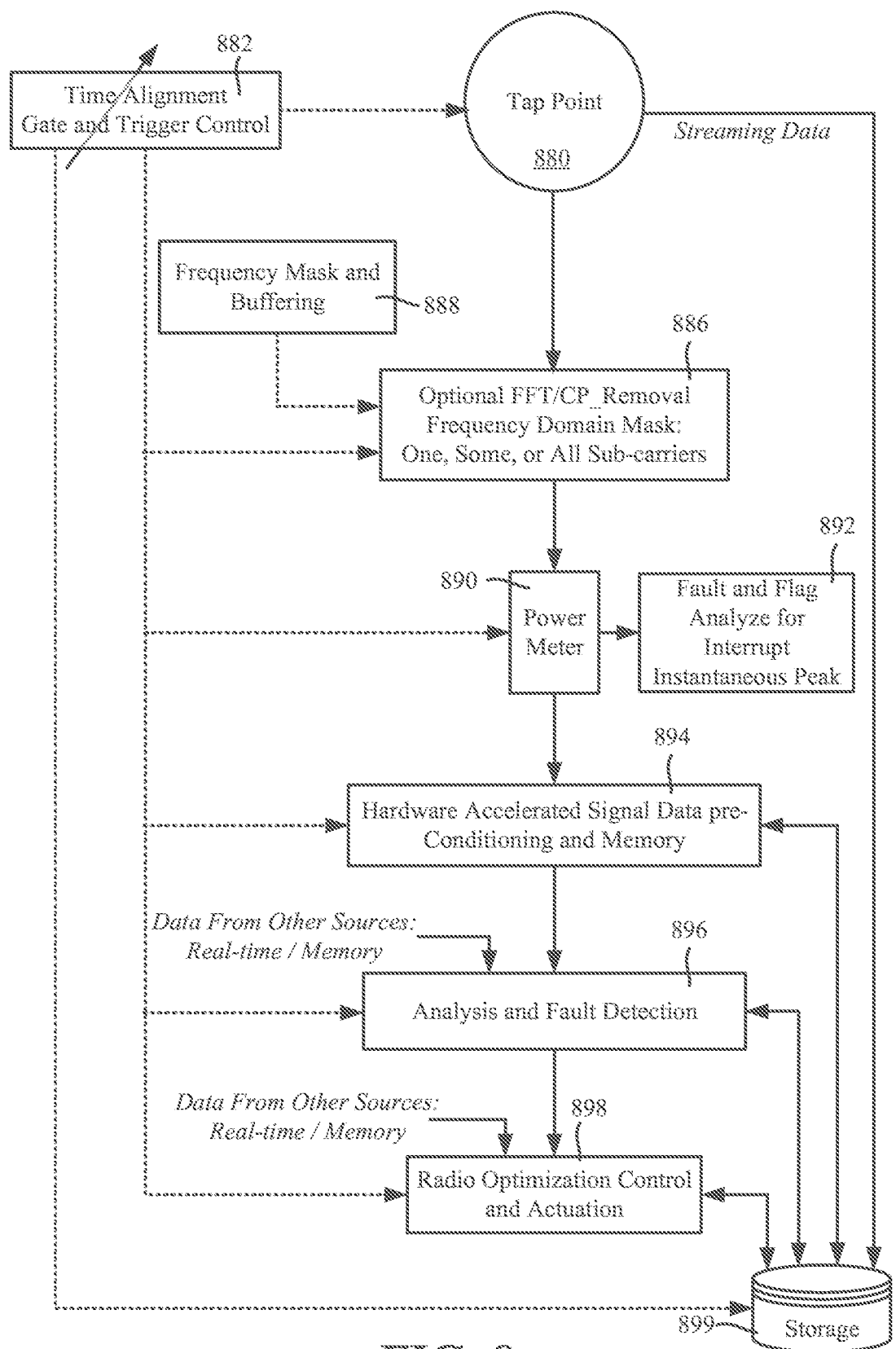
FIG. 8 is a block diagram representation of an example frequency domain source or tap point for detecting power and hardware acceleration of data preconditioning, in accordance with various aspects and embodiments of the subject disclosure.

FIG. 8 shows similar components to that of FIG. 7 for a frequency domain source or tap point 880. The components of/associated with the frequency domain source or tap point 880 are not described again for purposes of brevity, except to note that there is not a similar time domain sampler, mask and marker component (774, FIG. 7) for the frequency domain tap point of FIG. 8, and thus no bypass of FFT/CP_Removal frequency domain mask 886. Notwithstanding, use of the FFT/CP_Removal frequency domain mask 886 is optional.

Figure 9:
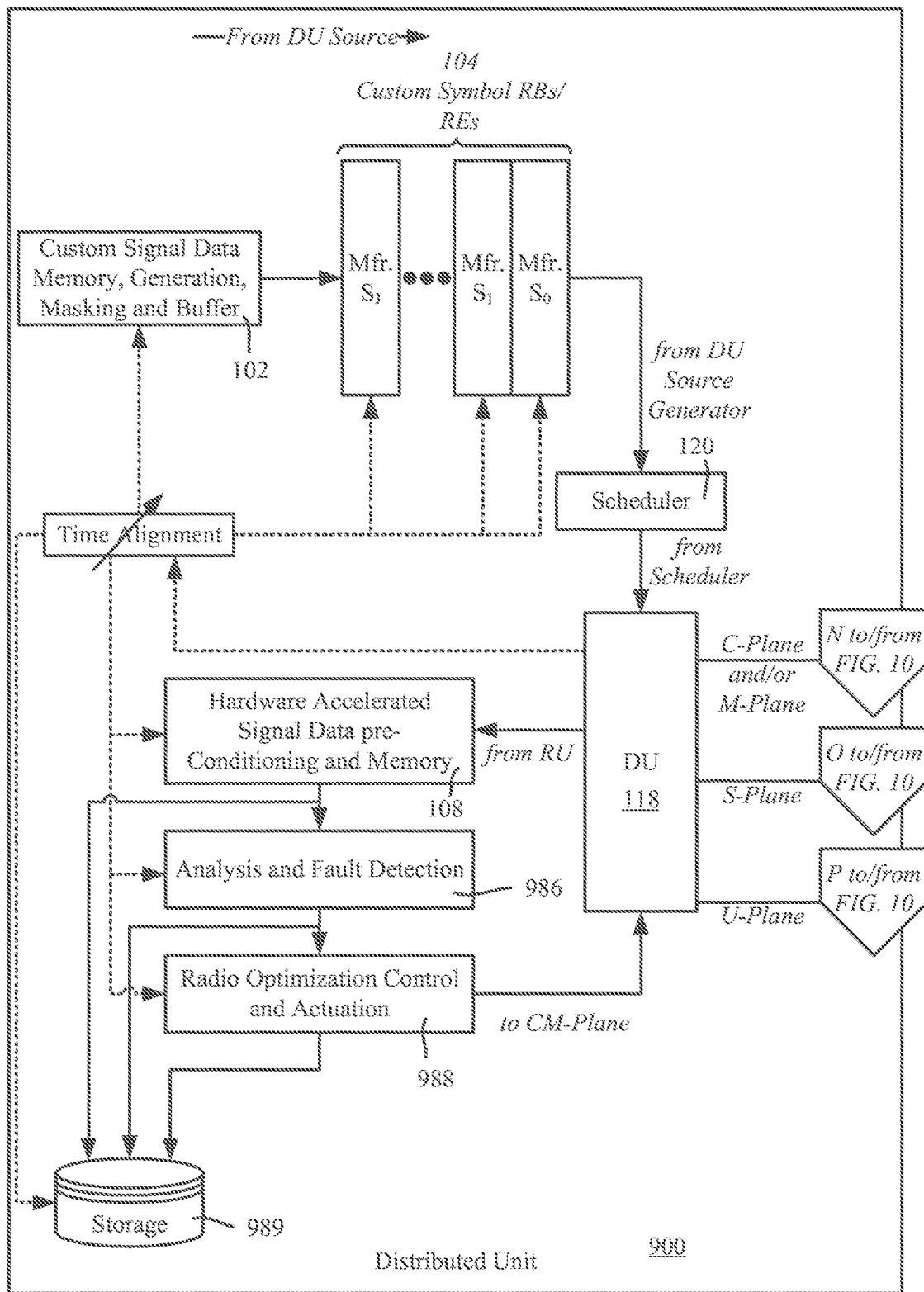
FIGS. 9-12 comprise a block diagram representation of an example system in which a distributed unit (FIG. 9) communicates with a radio unit (FIGS. 10-12), in accordance with various aspects and embodiments of the subject disclosure.

FIGS. 9-12 illustrate an example system architecture 200 for a distributed unit 900 (FIG. 9) and a radio unit 1000 (FIGS. 10-12) that can facilitate signal injection at radio tap points, in accordance with an embodiment of this disclosure. The components of FIG. 9 have been mostly described with reference to FIG. 1 and are not described again for purposes of brevity, except to note that the distributed unit 900 of FIG. 9 depicts Analysis and Fault Detection 986, Radio Optimization Control and Actuation 988 and storage 989, which are generally described with reference to FIGS. 2 and 3.

Figure 10:
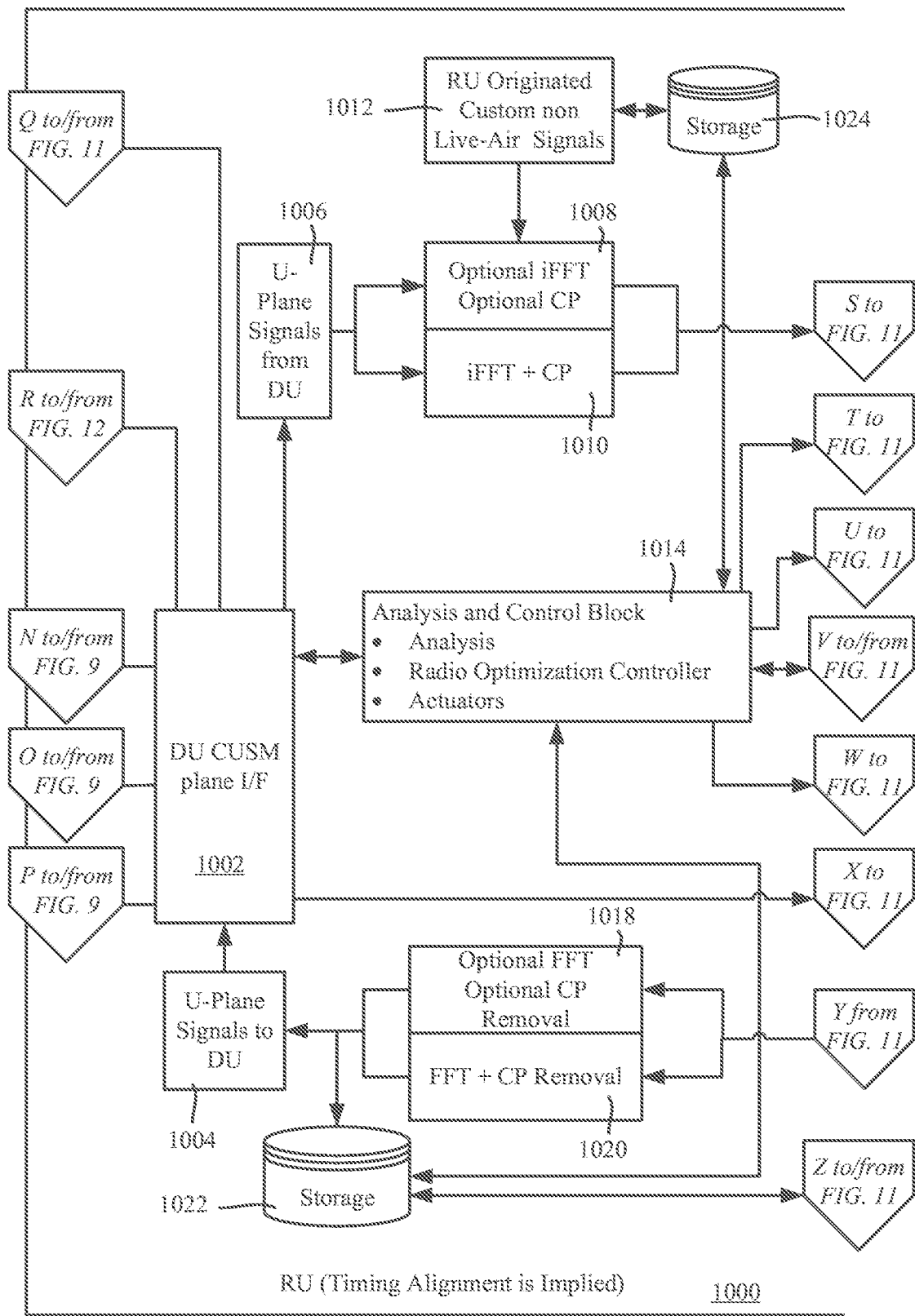
Figure 11:
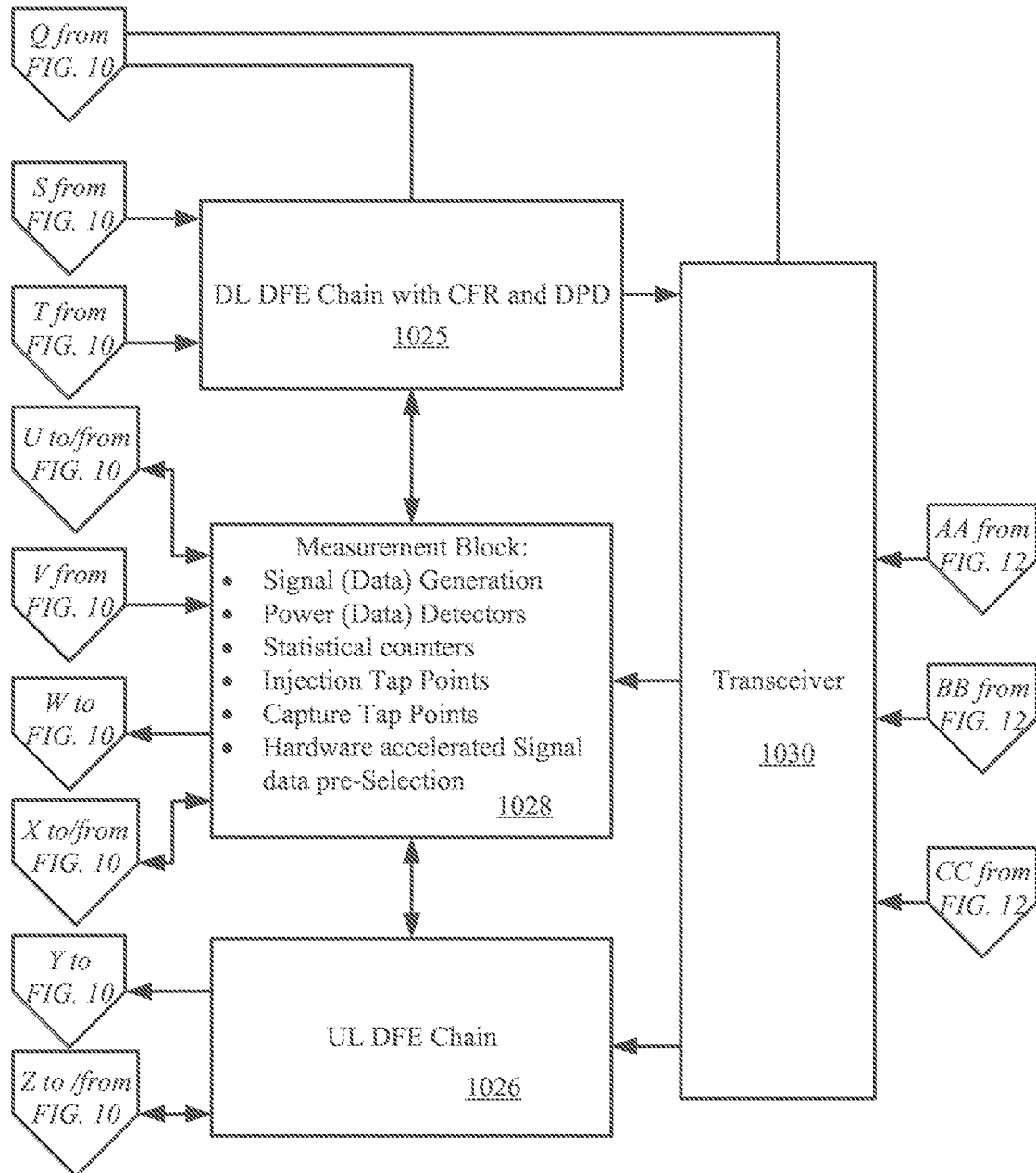
Figure 12:
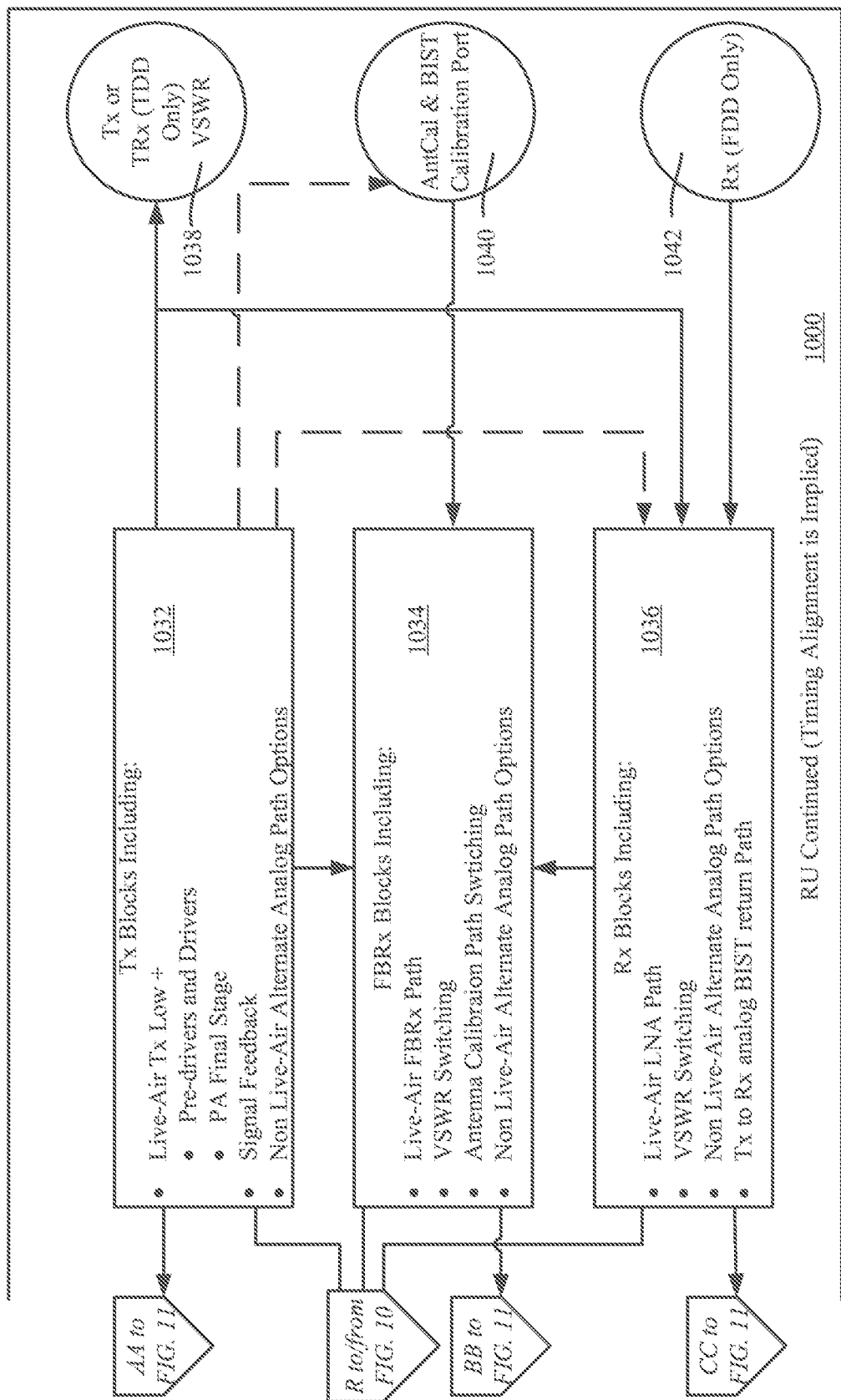

FIGS. 10-12 depict the radio unit 1000 part of the system architecture, which can include a downlink chain and an uplink signal chain as depicted in FIG. 11. Timing alignment as described above is implied in FIGS. 10-12.

As shown in FIG. 10, the radio 1000 comprises distributed unit (DU) control user synchronization management (CUSM) plane interface (I/F) 1002, live-air (user-plane) traffic signals 1004 from the DU 900, live-air (user-plane) traffic signals to DU 1006, optional iFFT and CP 1008, iFFT and CP 1010, and RU-originated custom non-live-air traffic signals 1012.

Analysis and control block 1014 provides for analysis, and includes a radio optimization controller and actuators. Also depicted is optional FFT and optional CP removal 1018 and FFT and CP removal 1020. Storage 1022 and storage 1024 are also shown in FIG. 10.

The example radio unit 1000 continues at FIG. 11, and includes a downlink (DL) DFE chain 1025 uplink (UL) DFE chain 1026, measurement block 1028 and transceiver 1030. The DL DFE chain 1025 can include CFR and DPD as described herein. The measurement block 1028 can comprise signal (data) generation, power (data) detectors, statistical counters, injection tap points, capture tap points, and/or hardware accelerated signal data pre-selection.

In the radio unit 1000 part of the system architecture, custom signals can be generated and then injected into tap points in either a downlink chain 1025 or an uplink chain 1026. Custom signals can be generated at RU originated custom non-live-air traffic signals 1012, and in some examples, combined with live-air traffic signals 1006 from the DU 900. The resulting signal can be injected into various parts of the DL DFE chain 1025 (via optional iFFT/optional CP 1008) or UL DFE chain 1026 via tap points of measurement block 1028.

The example radio unit 1000 also continues at FIG. 12, which depicts transmission (Tx) blocks 1032, feedback receiver (FBRx) blocks 1034, and receiver (Rx) blocks 1036, The Tx blocks 1032 can include Tx low, pre-drivers and drivers, power amplifier (PA, final stage), signal feedback, and non-live-air traffic alternate analog path options. The FBRx blocks 1034 can include a live-air traffic FBRx path, voltage standing wave ratio (VSWR) mode switching, and non-live-air traffic alternate analog path options. The Rx blocks 1036 can include a live-air traffic low noise amplifier (LNA) path, VSWR switching, and non-live-air traffic analog path options. Also shown are Tx or transceiver (TRx) port 1038, and antenna calibration (AntCal) and built-in self-test (BIST) calibration port 1040. The Rx 1042 can include a separate port for the case of frequency-division duplexing (FDD) radio architectures.

The example system architecture thus can function as a downlink signal path of the radio unit. As previously described, the example system architecture can include look up table, pseudo-random look up table generator, generator, memory, OR gate, masking, buffer, time alignment, and/or custom symbol RBs/REs.

Figure 13:
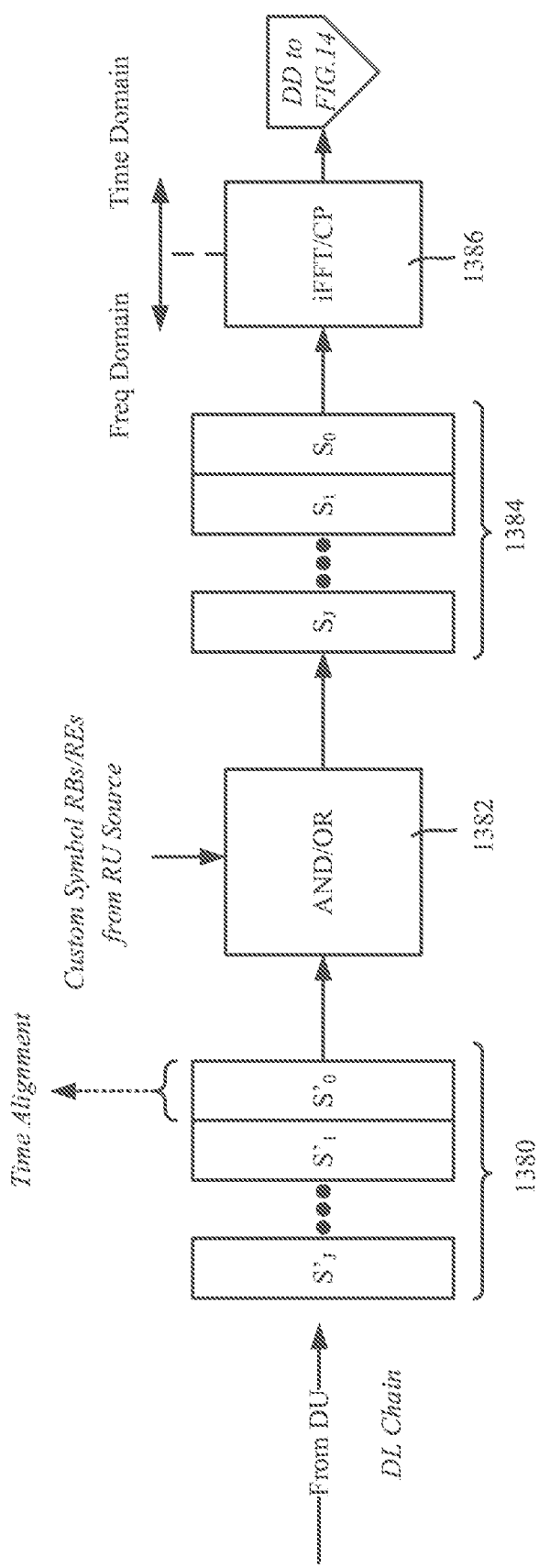
FIG. 13-15 illustrate an example system architecture for injecting a signal into a radio downlink chain, and that can facilitate signal injection at radio tap points, in accordance with an embodiment of this disclosure.

Continuing at FIG. 13, based on the scheduling, time alignment and the data 1380 from the distributed unit input into AND/OR gate 1382, the custom symbol RBs/REs from the radio unit source are injected into available PRBs, as represented by the symbols $S_0$-$S_J$ (labeled 1384). The output in turn becomes the input to inverse Fast Fourier Transform (iFFT) 1386 (which can also perform Δ gain, time alignment, and optional cyclic prefix (CP) insertion).

Figure 14:
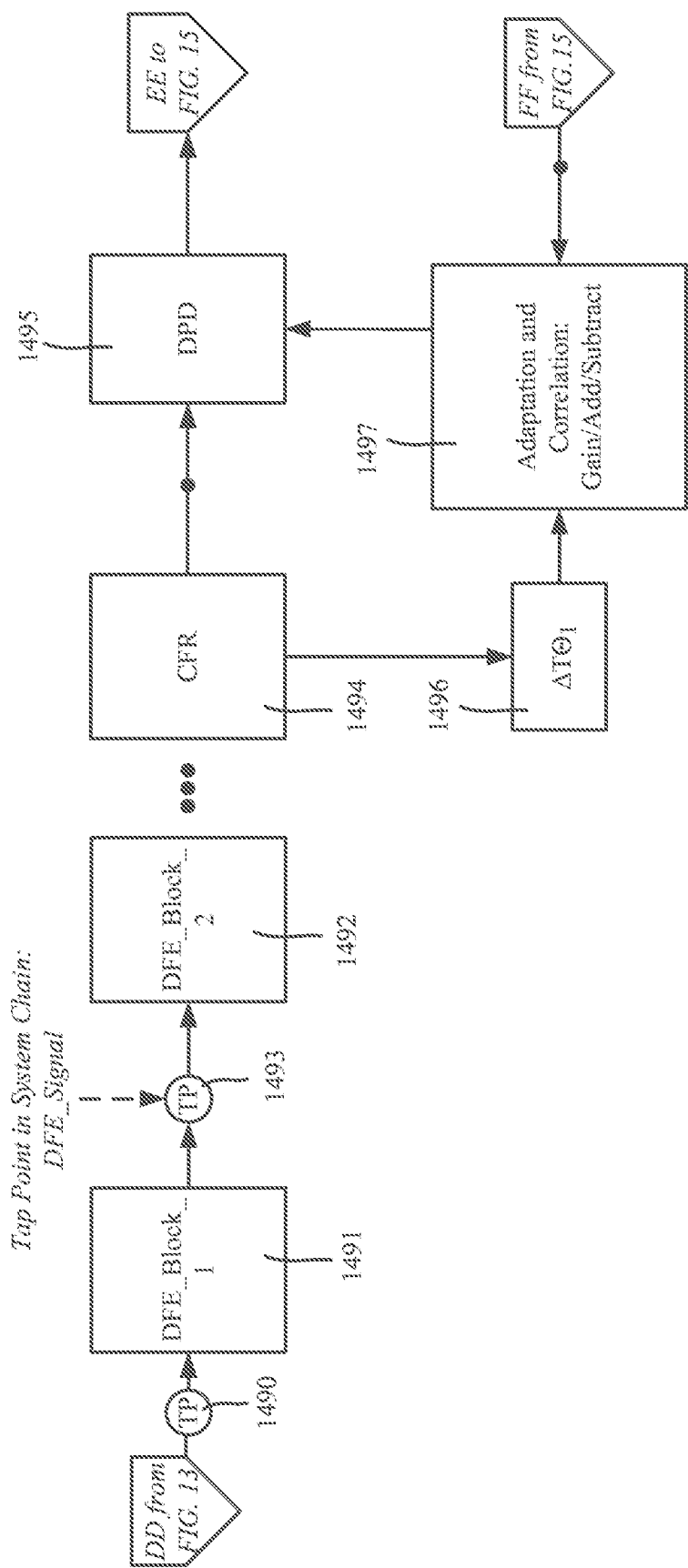

Continuing at FIG. 14, a first tap point 1490 allows insertion, if desired, into the signal chain prior to digital front end (DFE) block 1 1491, which is followed in the chain by DFE_block_2 1492. Between the DFE_block_1 1491 and the DFE_block_2 1492, a DFE_Signal tap point 1493 is shown. As is understood, there can be more than the two depicted DFE blocks 1491 and 1492, and a tap point can be between each additional pair.

Following the (any practical number of) DFE blocks, are crest factor reduction (CFR) function 1494 and digital pre-distortion (DPD) 1495 blocks. In general, the CFR function 1494 reduces peak amplitude portions of the input signal to produce a clipped input signal. The clipped input signal is processed by DPD 1495, which applies error correction factors to result in a digitally pre-distorted signal that is provided to transmit digital to analog converter.

The crest factor reduction 1494 is also coupled to delta-time-phase ($\Delta T\Theta_1$) 1496, which in turn is coupled to adaptation and correlation function (block 1497), which provides additional (gain (delta M, or magnitude matching), add or subtract) input to the digital pre-distortion (DPD) 1495 block.

Figure 15:
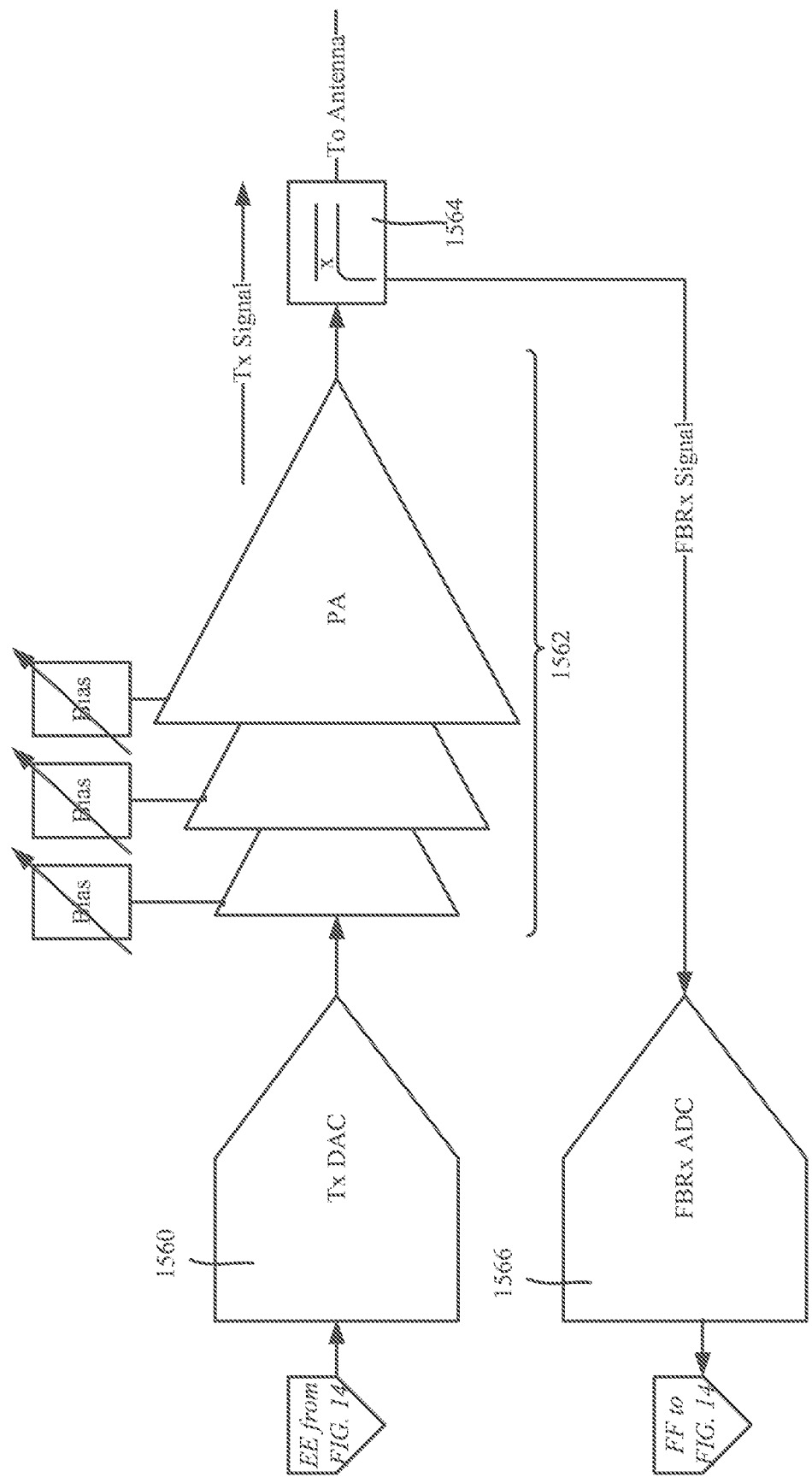

Continuing at FIG. 15, the output of the digital pre-distortion 1495 is fed into a transmitter (Tx) digital-to-analog converter (DAC) 1560, with the resulting analog signal amplified by power amplifiers 1562, which can be independently biased. More particularly, the DAC 1560 provides an analog version of the pre-distorted clipped input signal to the power amplifier(s) 1562, which provide an amplified version of the analog version of the pre-distorted clipped input signal at an output of the power amplifier.

The analog version of the pre-distorted clipped input signal may be referred to as a low-level analog transmit signal; the amplified version of the analog version of the pre-distorted clipped input signal may be referred to as an amplified analog transmit signal. The amplified analog transmit signal is provided from the power amplifiers 1562 to a signal coupler 1564, which forwards most of the power of the amplified analog transmit signal to an antenna for transmission.

Additionally, the signal coupler 1564 returns a portion of the signal to a feedback receiver FBRx analog-to-digital converter (ADC) 1566. Returning to FIG. 14, the resulting digital representation of the signal is fed back as additional input to the adaptation and correlation block 1497.

More particularly, the signal coupler 1564 routes a smaller (or attenuated) portion, or feedback portion, of the amplified analog transmit signal to the receiver analog to digital converter 1566, which may digitize the feedback portion into a digital version thereof and provide the digitized version of the feedback portion of the amplified analog transmit signal to adaptation and correlation gain/add/subtract function 1497, more simply referred to as adaptation function 1497. The adaptation function 1497 may be referred to as an error correction component, which may use factors, and which may include values, coefficients, expressions, functions, from time and phase difference ($\Delta T\Theta$) function 1496, to determine one or more signal correction factors to be provide to the DPD function 1495. The $\Delta T\Theta$ function 1496 may apply the signal correction factors to a signal received from CFR function 1494. Correction factors may be determined such that signals at certain nodes are time-aligned. In other words, correction factors may be determined such that amplitudes and phases (or delay(s)) of signals that are to be added together are in phase with one another if enhancement of a given signal is desired, or out of phase if cancellation of the given signals is desired.

The signal correction factors may be values, or coefficients, stored in registers or the like of the $\Delta T\Theta$ function 1496 which, when, or if, processed by DPD function 1495. The adaptation function 1497 may recall the factors stored in $\Delta T\Theta$ function 1496 and produce a signal that corresponds to the difference between the feedback signal from coupler 1564 and the input signal from CRF 1494 (provided to the $\Delta T\Theta_1$ function 1496).

The adaptation function 1497 may comprise, or perform, a mathematical function, for example a cost function, that uses correction factors retrieved from $\Delta T\Theta$ function 1496 to create/generate a correction signal that DPD 1495 applies to an input signal from the CFR function 1494. It will be appreciated that upconverters and downconverters may be present in a radio unit between the DAC 1564 and the power amplifies 1562, and/or between coupler 1564 and the 1566, respectively, but are not shown in the figure for clarity; (depending on the style of DAC or ADC, for example Sigma-Delta, upconverters or downconverters may not be used.)

Figure 16:
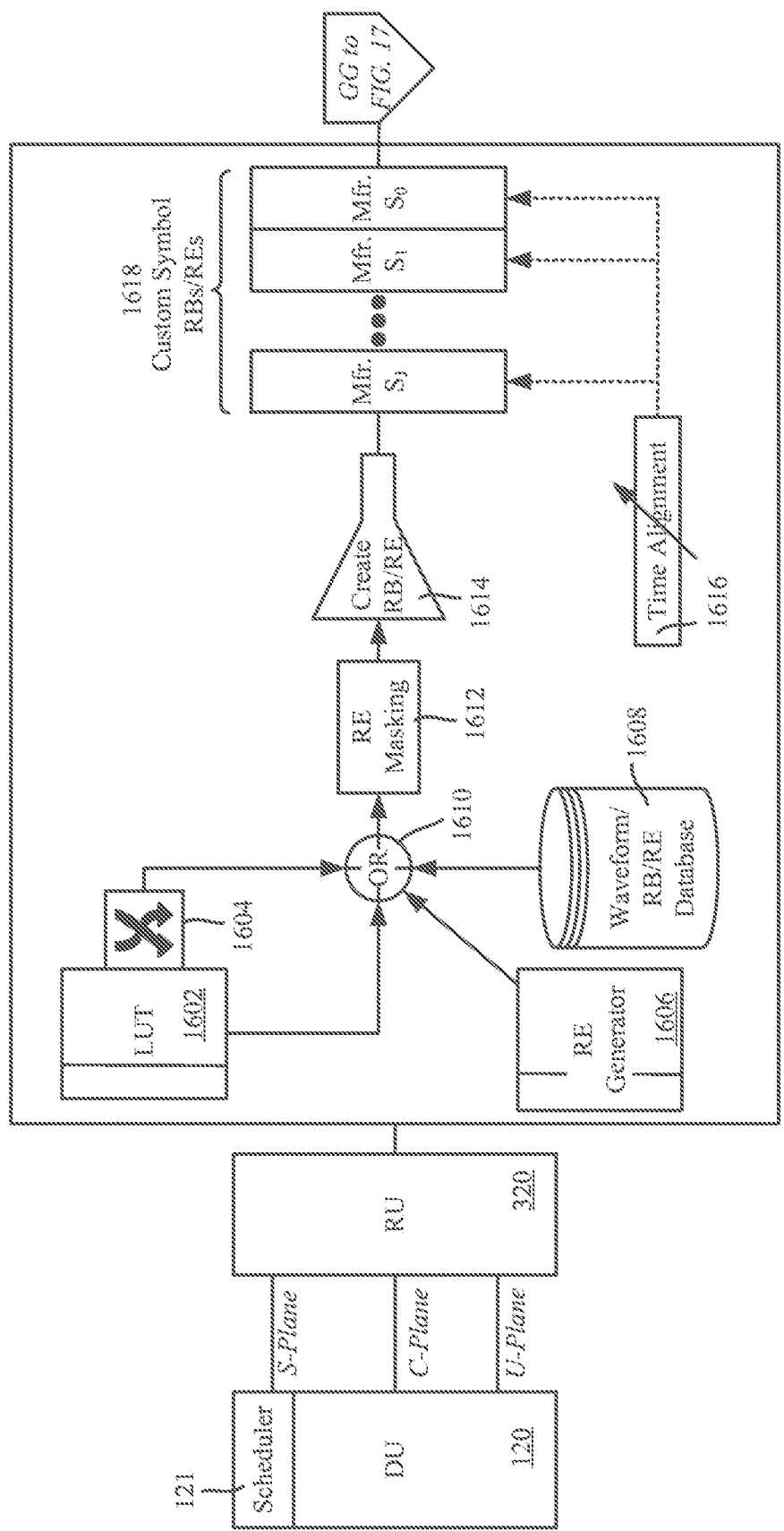
FIG. 16-18 illustrate an alternative example system architecture for injecting a signal into a radio downlink chain, and that can facilitate signal injection at radio tap points, in accordance with an embodiment of this disclosure.
Figure 17:
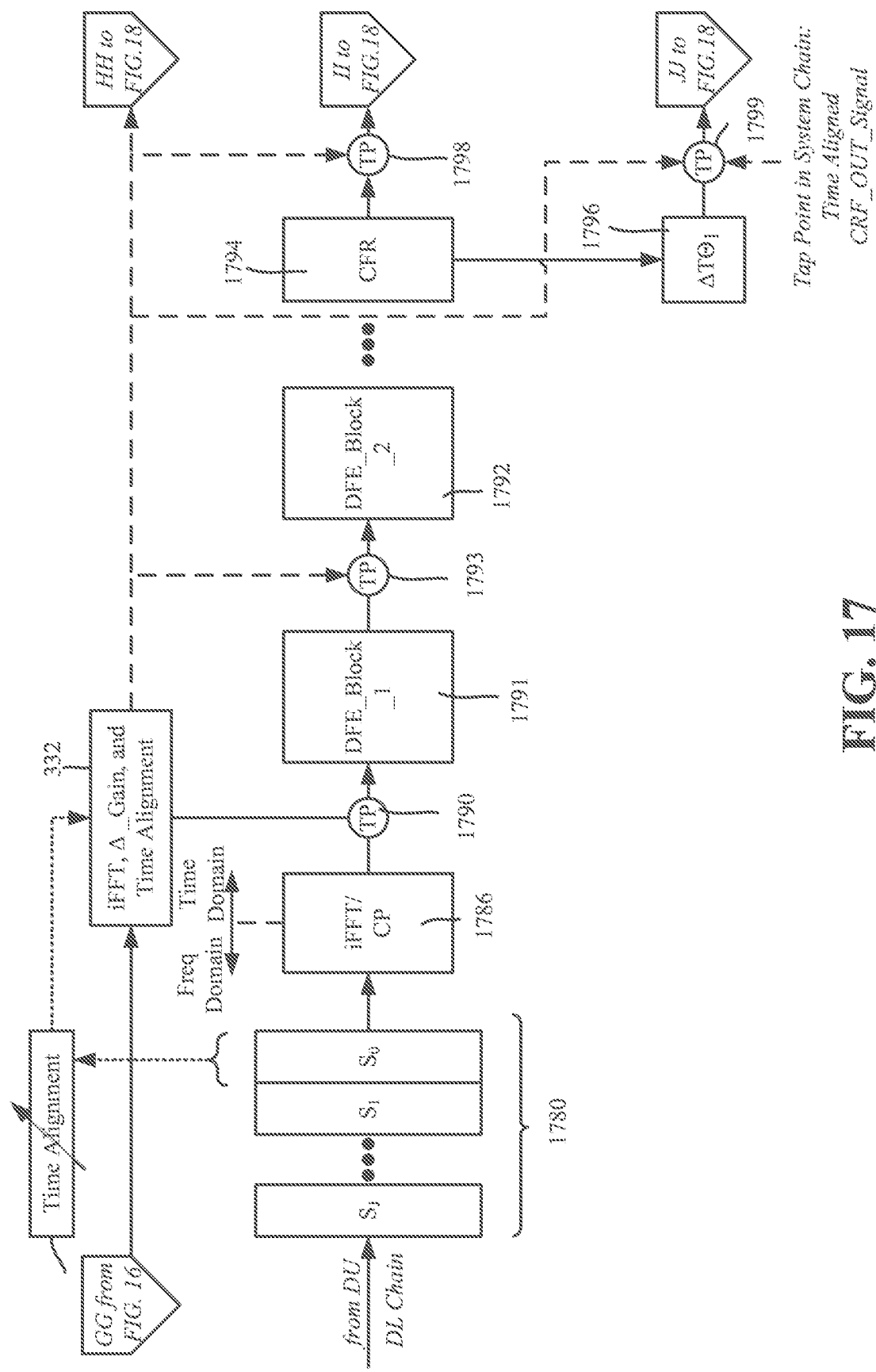
Figure 18:
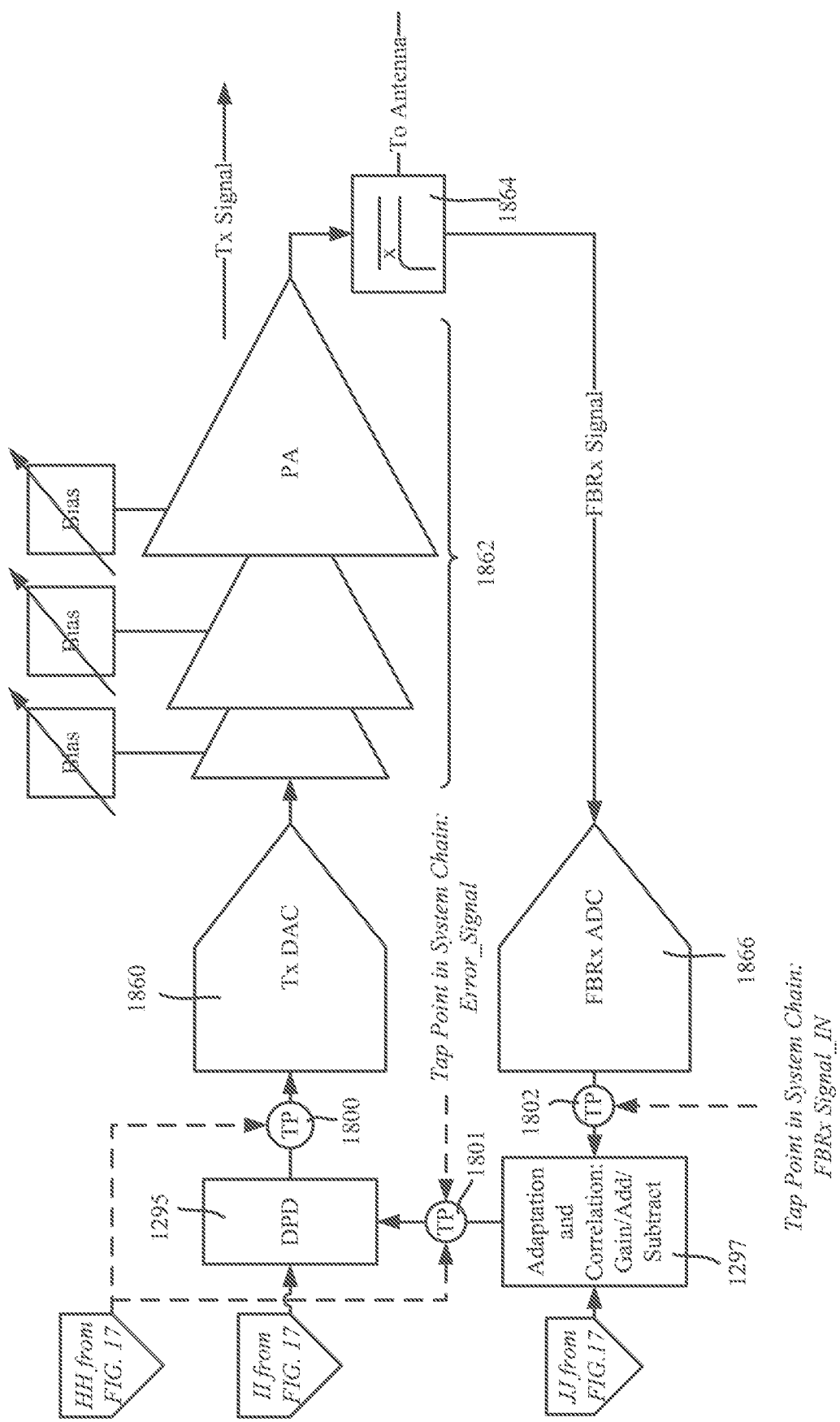

FIGS. 16-18 represent an alternative example signal chain architecture into which custom signals can be injected at any of various tap points, including those depicted and labeled 1790, 1793, 1798 and 1799 (FIG. 17) and 1800, 1801 and 1802 (FIG. 18). The components of FIGS. 16-18 have been previously described, and thus their structure and functionality are not again described for purposes of brevity.

In FIG. 17, in addition to the tap points 1790 and 1793 before DFE blocks 1791 and 1792, a tap point 1798 is provided before the DPD 1795. A tap point 1799 in the system chain corresponds to a time aligned CRF_OUT_Signal. The Error_Signal tap point is labeled 1801 in FIG. 18. Also shown in FIG. 18 is an FBRx Signal_IN tap point 1802.

Figure 19:
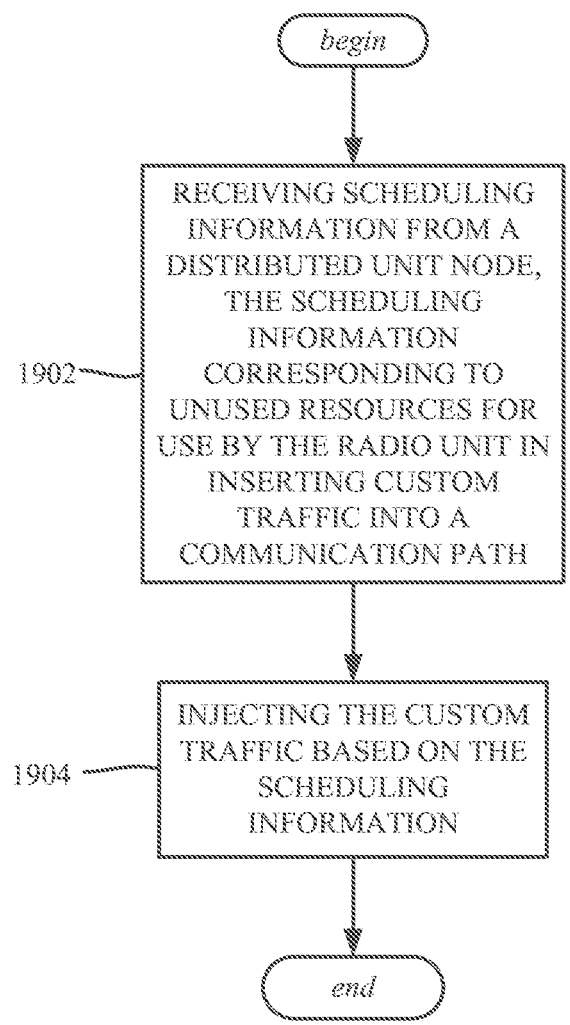
FIG. 19 is a flow diagram representing example operations related to a radio unit injecting custom traffic into a communication path based on scheduling information received from a distributed node, in accordance with various aspects and embodiments of the subject disclosure.

One or more aspects can be embodied in a distributed unit node of a wireless communications network, such as represented in FIG. 19, and for example can comprise a memory that stores computer executable components and/or operations, and a processor that executes computer executable components and/or operations stored in the memory. Example operations can comprise operation 1902, which represents receiving scheduling information from a distributed unit node, the scheduling information corresponding to unused resources for use by the radio unit in inserting custom traffic into a communication path. Example operation 1904 represents injecting the custom traffic based on the scheduling information.

The unused resources can include unscheduled physical resource blocks.

The custom traffic can include at least one of: symbol data, resource block data, resource element data, modulation and coding scheme data, load data or no (blanked) data. Receiving scheduling information from the distributed unit node comprises receiving resource blocks allocation open for injecting the custom traffic via user-plane communications, and receiving timing and synchronization message data via control-plane communications.

Further operations can include obtaining radio unit performance data based on the custom traffic, processing the performance data to determine modified operating parameter data of the radio unit, and changing an operating state of the radio unit from a first operating state to a second operating state based on the modified parameter data.

Further operations can include requesting the scheduling information from the distributed unit node; receiving the scheduling information can occur in response to the requesting.

Receiving the scheduling information from the distributed unit node can include coordinating with the distributed unit node to unused resources the scheduling information according to a predetermined pattern.

The scheduling information can schedule the unused resources for injecting the custom traffic interleaved with live-air traffic.

The scheduling information can schedule the unused resources for injecting the custom traffic in at least one of: guard slots, or private slots separate from slots scheduled for live-air traffic.

The scheduling information can schedule the unused resources for injecting the custom traffic interleaved with non-live-air traffic.

Figure 20:
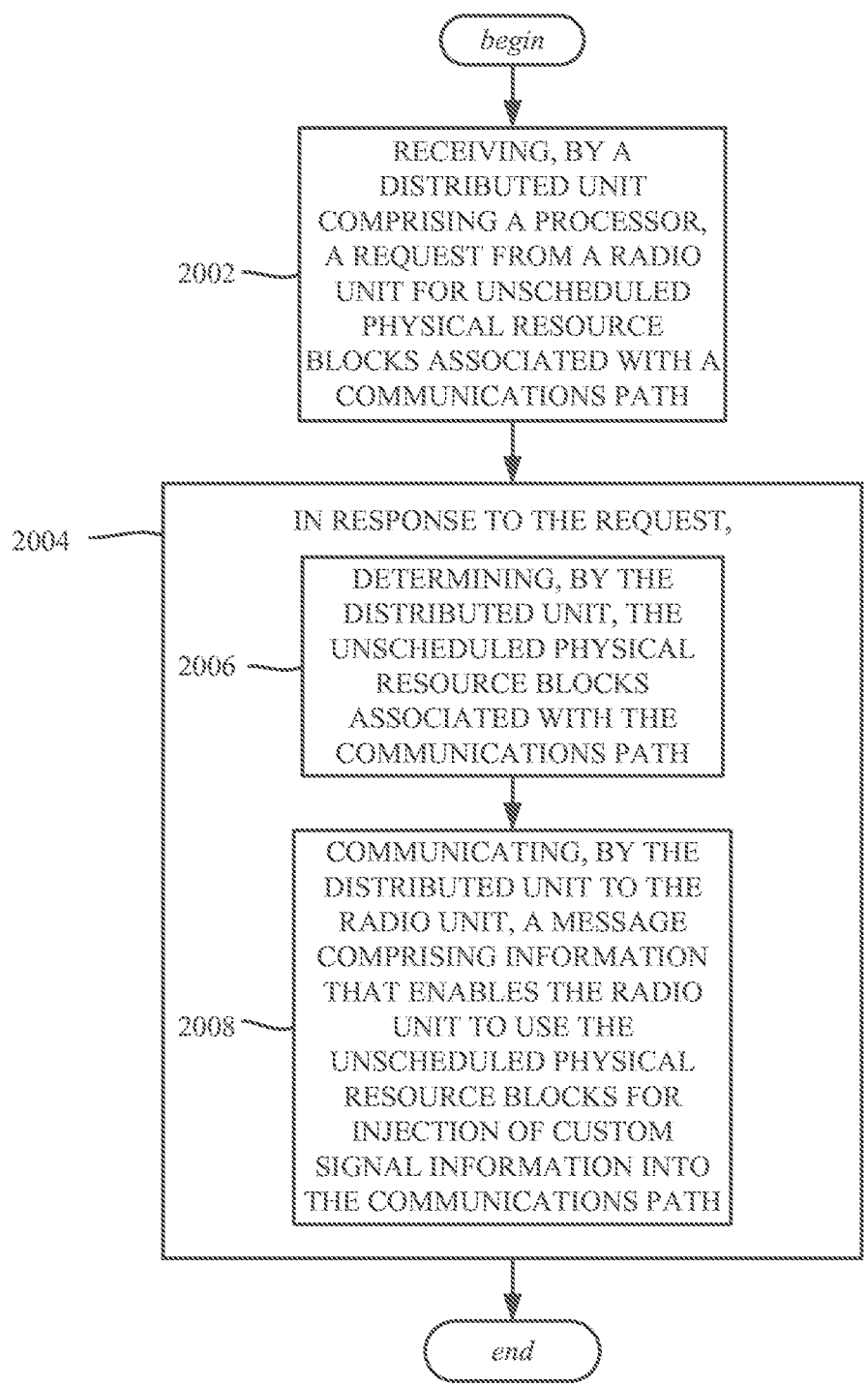
FIG. 20 is a flow diagram representing example operations related to a distributed node responding to a request from a radio unit, including providing unscheduled physical resource blocks for injection of custom signal information by the radio unit, in accordance with various aspects and embodiments of the subject disclosure.

One or more aspects can be embodied in a method, such as represented in FIG. 20. Example operations can comprise operation 2002, which represents receiving, by a distributed unit comprising a processor, a request from a radio unit for unscheduled physical resource blocks associated with a communications path. In response to the request (operation 2004), operations can include determining, by the distributed unit, the unscheduled physical resource blocks associated with the communications path (operation 2006), and communicating, by the distributed unit to the radio unit, a message comprising information that enables the radio unit to use the unscheduled physical resource blocks for injection of custom signal information into the communications path (operation 2008).

Further operations can include originating, by the distributed unit, an un-scheduling of the physical resource blocks to obtain the unscheduled physical resource blocks.

Further operations can include receiving, by the distributed unit from the radio unit, performance data obtained by the radio unit based on the custom signal information, determining, by the distributed unit based on the performance data, a modified operating state of the radio unit, and communicating data, by the distributed unit to the radio unit, to change operation of the radio unit to the modified operating state.

Further operations can include preconfiguring, by the distributed unit, the radio unit to run a defined test to obtain the performance data.

Further operations can include messaging, by the distributed unit, radio performance improvement option data to the radio unit.

Figure 21:
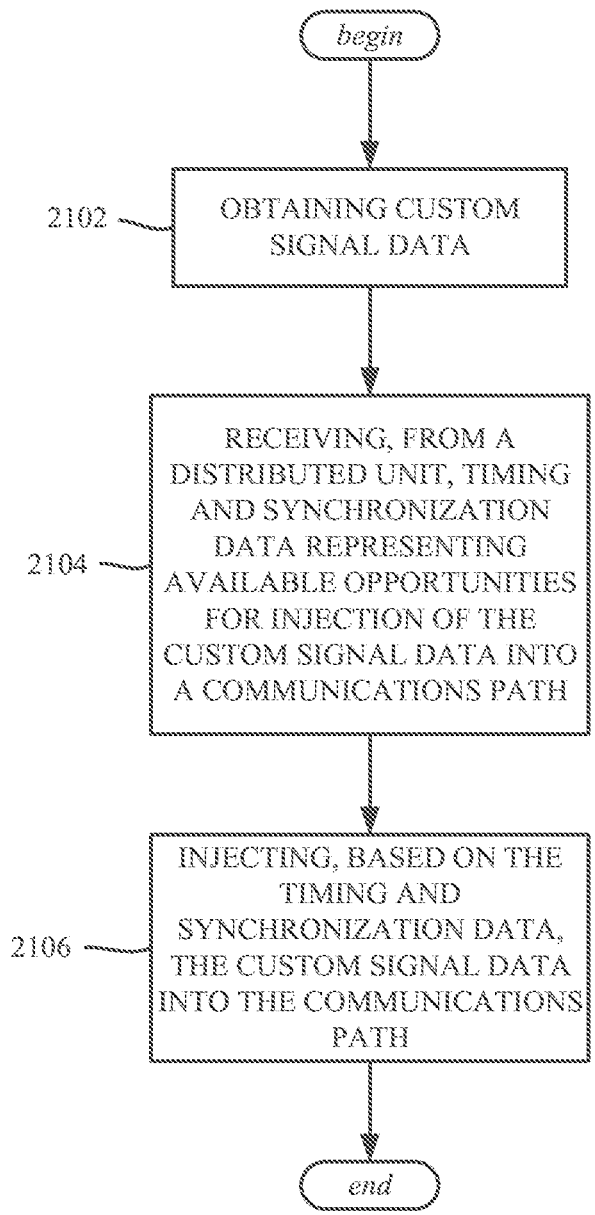
FIG. 21 is a flow diagram representing example operations related to a radio unit injecting custom signal information into a communications path based on timing and synchronization data received from a distributed unit, in accordance with various aspects and embodiments of the subject disclosure.

FIG. 21 summarizes various example operations, e.g., corresponding to a machine-readable storage medium, comprising executable instructions that, when executed by a processor of a radio unit, facilitate performance of operations. Operation 2102 represents obtaining custom signal data. Operation 2104 represents receiving, from a distributed unit, timing and synchronization data representing available opportunities for injection of the custom signal data into a communications path. Operation 2106 represents injecting, based on the timing and synchronization data, the custom signal data into the communications path.

The timing and synchronization data can include a resource block matrix can including unscheduled locations corresponding to the available opportunities, and injecting the custom signal data into the communications path can include injecting at least one of custom resource blocks or resource elements into at least some of the unscheduled locations.

Obtaining the custom signal data can include generating the custom signal data.

Injecting the custom signal data into the communications path can perform a defined application, comprising at least one of: an antenna calibration application, a radio unit self-test application, or a performance measurement application for increasing energy efficiency of the radio unit.

Further operations can include obtaining results based on the injecting the custom signal data into the communications path, and returning data corresponding to the results to the distributed unit.

Figure 22:
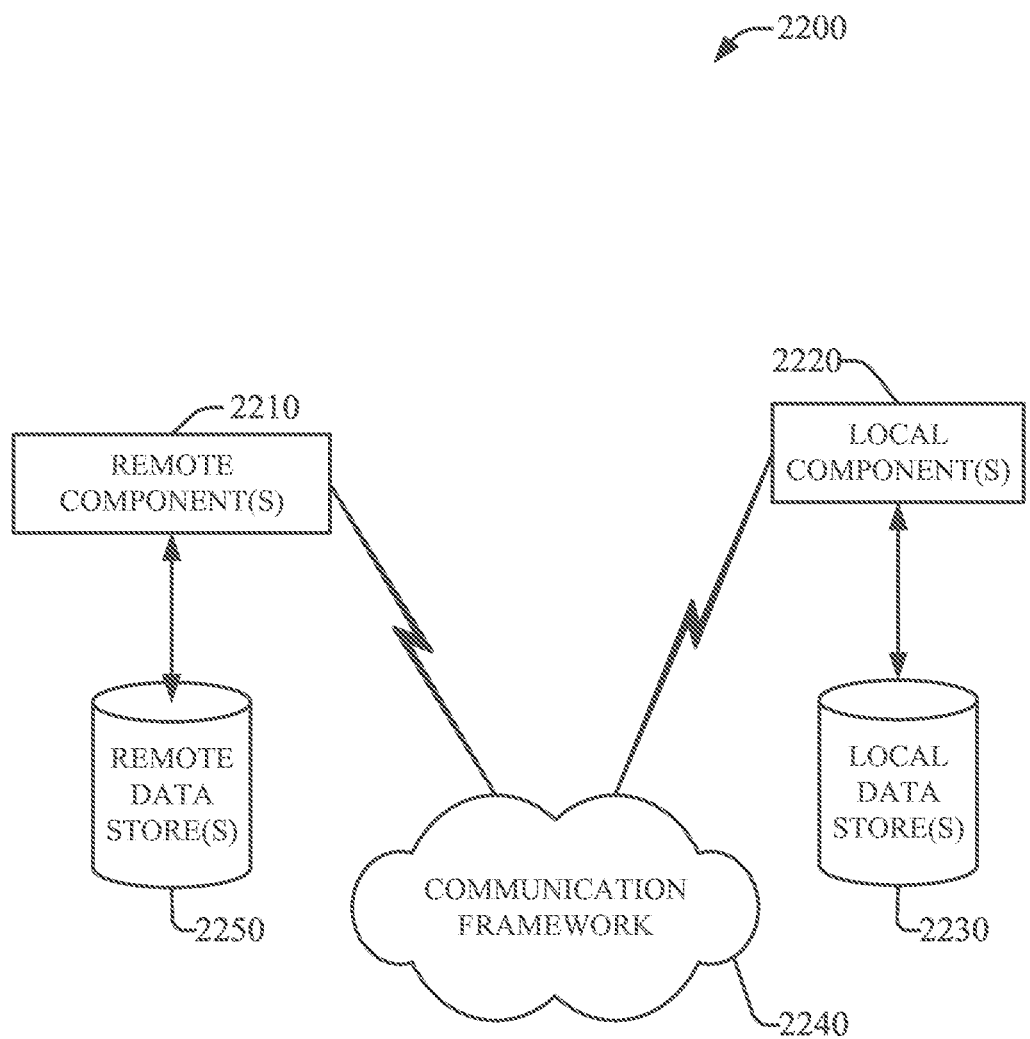
FIG. 22 is a block diagram representing an example computing environment into which aspects of the subject matter described herein may be incorporated.

FIG. 22 is a schematic block diagram of a computing environment 2200 with which the disclosed subject matter can interact and/or be incorporated to an extent. The system 2200 comprises one or more remote component(s) 2210. The remote component(s) 2210 can be hardware and/or software (e.g., threads, processes, computing devices). In some embodiments, remote component(s) 2210 can be a distributed computer system, connected to a local automatic scaling component and/or programs that use the resources of a distributed computer system, via communication framework 2240. Communication framework 2240 can comprise wired network devices, wireless network devices, mobile devices, wearable devices, radio access network devices, gateway devices, femtocell devices, servers, etc.

The system 2200 also comprises one or more local component(s) 2220. The local component(s) 2220 can be hardware and/or software (e.g., threads, processes, computing devices). In some embodiments, local component(s) 2220 can comprise an automatic scaling component and/or programs that communicate/use the remote resources 2210 and 2220, etc., connected to a remotely located distributed computing system via communication framework 2240.

One possible communication between a remote component(s) 2210 and a local component(s) 2220 can be in the form of a data packet adapted to be transmitted between two or more computer processes. Another possible communication between a remote component(s) 2210 and a local component(s) 2220 can be in the form of circuit-switched data adapted to be transmitted between two or more computer processes in radio time slots. The system 2200 comprises a communication framework 2240 that can be employed to facilitate communications between the remote component(s) 2210 and the local component(s) 2220, and can comprise an air interface, e.g., Uu interface of a UMTS network, via a long-term evolution (LTE) network, etc. Remote component(s) 2210 can be operably connected to one or more remote data store(s) 2250, such as a hard drive, solid state drive, SIM card, device memory, etc., that can be employed to store information on the remote component(s) 2210 side of communication framework 2240. Similarly, local component(s) 2220 can be operably connected to one or more local data store(s) 2230, that can be employed to store information on the local component(s) 2220 side of communication framework 2240.

Figure 23:
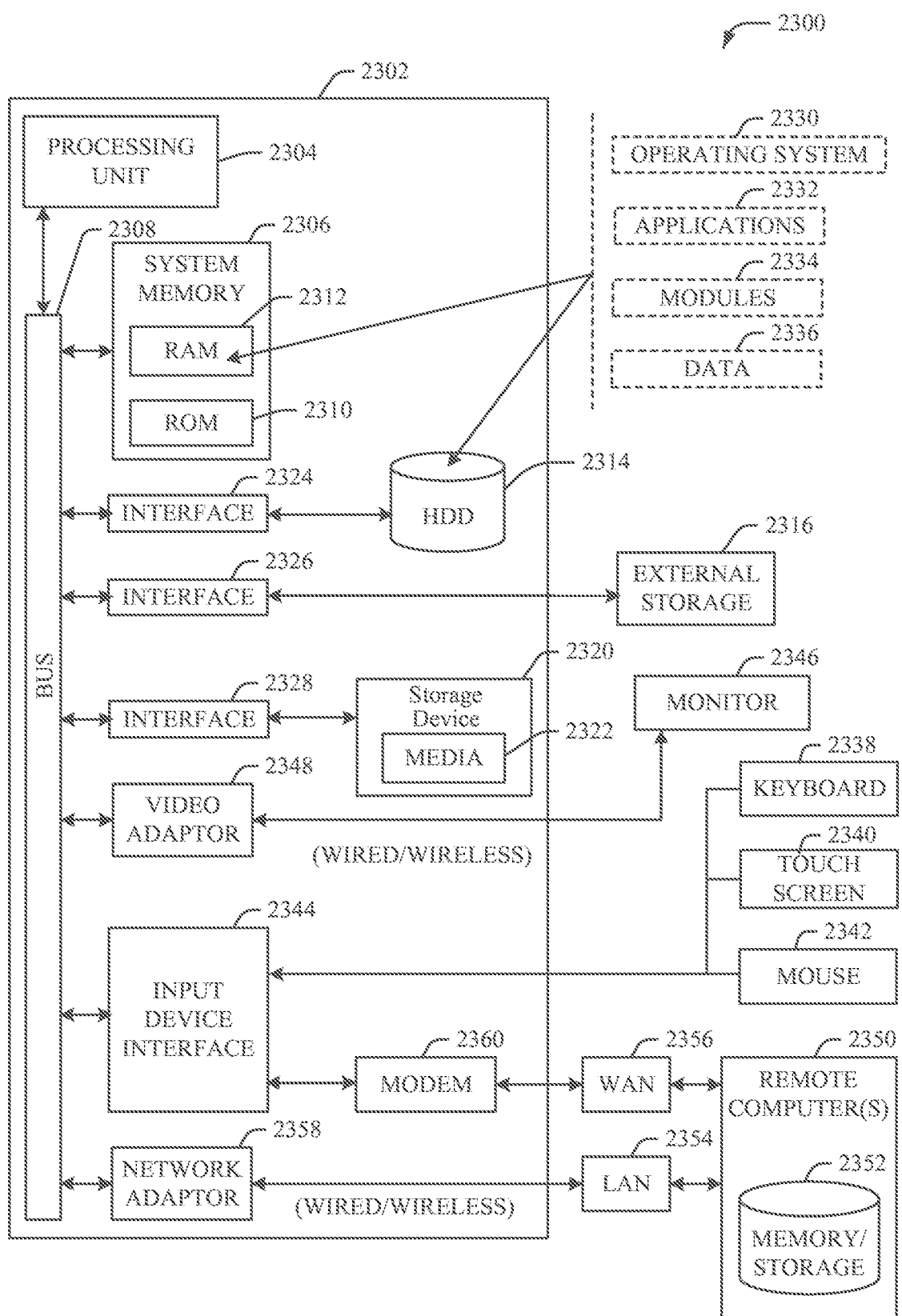
FIG. 23 depicts an example schematic block diagram of a computing environment with which the disclosed subject matter can interact/be implemented at least in part, in accordance with various aspects and implementations of the subject disclosure.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), and can include one or more external storage devices 2316 (e.g., a magnetic floppy disk drive (FDD) 2316, a memory stick or flash drive reader, a memory card reader, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314.

Other internal or external storage can include at least one other storage device 2320 with storage media 2322 (e.g., a solid state storage device, a nonvolatile memory device, and/or an optical disk drive that can read or write from removable media such as a CD-ROM disc, a DVD, a BD, etc.). The external storage 2316 can be facilitated by a network virtual machine. The HDD 2314, external storage device(s) 2316 and storage device (e.g., drive) 2320 can be connected to the system bus 2308 by an HDD interface 2324, an external storage interface 2326 and a drive interface 2328, respectively.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enabled with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 1394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired and/or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 and/or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired and/or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 and/or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating media, transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a wireless capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A radio unit of a wireless communications network, comprising:
   at least one processor; and
   at least one memory that stores executable instructions that, when executed by the at least one processor, facilitate performance of operations, the operations comprising:
   receiving, via a control-plane communication, scheduling data from a distributed unit node, the scheduling data corresponding to unused resources for use by the radio unit in inserting custom traffic data into a communication path, wherein the custom traffic data was received via a user-plane communication; and
   based on the scheduling data, injecting the custom traffic data into the communication path.

2. The radio unit of claim 1, wherein the unused resources comprise unscheduled physical resource blocks.

3. The radio unit of claim 1, wherein the custom traffic data comprises at least one of: symbol data, resource block data, resource element data, modulation and coding scheme data, load data, or data that has been blanked.

4. The radio unit of claim 3, wherein the scheduling data comprises unscheduled physical resource blocks available for injection of the custom traffic data.

5. The radio unit of claim 1, wherein the operations further comprise:

obtaining radio unit performance data based on the custom traffic data,
   processing the performance data to determine modified operating parameter data of the radio unit, and
   changing an operating state of the radio unit from a first operating state to a second operating state based on the modified parameter data.

6. The radio unit of claim 1, wherein the operations further comprise requesting the scheduling data from the distributed unit node, and wherein the receiving of the scheduling data occurs in response to the requesting.

7. The radio unit of claim 1, wherein the receiving the scheduling data from the distributed unit node comprises coordinating the scheduling data with the distributed unit node, according to a predetermined pattern.

8. The radio unit of claim 1, wherein the scheduling data is configured to schedule the unused resources for injection of the custom traffic data as custom data interleaved with live-air traffic.

9. The radio unit of claim 1, wherein the scheduling data is configured to schedule the unused resources for injection of the custom traffic data into at least one of: guard slots, or private slots separate from slots scheduled for live-air traffic.

10. The radio unit of claim 1, wherein the scheduling data is configured to schedule the unused resources for injection of the custom traffic data as custom data interleaved with non-live-air traffic.

11. A method, comprising:
    receiving, by a distributed unit comprising at least one processor, a request from a radio unit for unscheduled physical resource blocks associated with a communications path;
    in response to the request, determining by the distributed unit, the unscheduled physical resource blocks;
    communicating, by the distributed unit, to the radio unit via a control-plane communication, a first message comprising scheduling information that enables the radio unit to use the unscheduled physical resource blocks for injection of custom signal information into the communications path, wherein the custom signal information was received via a user-plane communication; and
    communicating, by the distributed unit, to the radio unit via a user-plane communication,
    a second message comprising source information, wherein the custom signal information is based on the source information.

12. The method of claim 11, further comprising originating, by the distributed unit, an un-scheduling of the physical resource blocks to obtain the unscheduled physical resource blocks.

13. The method of claim 11, further comprising:
    receiving, by the distributed unit, from the radio unit, performance information obtained by the radio unit based on the custom signal information;
    determining, by the distributed unit based on the performance information, a modified operating state of the radio unit; and
    communicating, by the distributed unit, to the radio unit, information configured to change an operating state of the radio unit to a modified operating state.

14. The method of claim 13, further comprising preconfiguring, by the distributed unit, the radio unit to run a defined test to obtain the performance information.

15. The method of claim 13, further comprising messaging, by the distributed unit, radio performance improvement option information to the radio unit.

16. A non-transitory machine-readable medium, comprising executable instructions that, when executed by at least one processor of a radio unit, facilitate performance of operations, the operations comprising:
- receiving live-air traffic data;
- based on the live-air traffic data, generating custom signal data;
- receiving, from a distributed unit via a control-plane communication, timing and synchronization data representing available opportunities for injection of the custom signal data into a communications path; and
- injecting, based on the timing and synchronization data, the custom signal data into the communications path.

17. The non-transitory machine-readable medium of claim 16, wherein the timing and synchronization data comprises a resource block matrix comprising unscheduled locations corresponding to the available opportunities, and wherein the injecting the custom signal data into the communications path comprises injecting at least one of custom resource blocks or resource elements into the unscheduled locations.

18. The non-transitory machine-readable medium of claim 16, wherein the injecting of the custom signal data into the communications path is usable to perform a defined application comprising at least one of: an antenna calibration application, a radio unit self-test application, or a performance measurement application usable to increase energy efficiency of the radio unit.

19. The non-transitory machine-readable medium of claim 16, wherein the operations further comprise:
- based on the injecting of the custom signal data into the communications path, obtaining results of the injecting of the custom signal data, and
- returning, to the distributed unit, data corresponding to the results.

20. The non-transitory machine-readable medium of claim 16, wherein the receiving of the live-air traffic data comprises receiving the live-air traffic data via a user plane communication.

* * * * *